(12) United States Patent
Jacobson

(10) Patent No.: US 7,689,563 B1
(45) Date of Patent: Mar. 30, 2010

(54) ELECTRONIC RECORD MANAGEMENT SYSTEM

(76) Inventor: Andrea M. Jacobson, 250 E. Sixth St., #610, St. Paul, MN (US) 55101

( * ) Notice: Subject to any disclaimer, the term of this patent is extended or adjusted under 35 U.S.C. 154(b) by 0 days.

(21) Appl. No.: 09/175,589

(22) Filed: Oct. 20, 1998

(51) Int. Cl.
*G06F 17/30* (2006.01)
*G06F 15/167* (2006.01)
*G06F 11/00* (2006.01)

(52) U.S. Cl. .................. 707/10; 709/209; 726/25; 726/26

(58) Field of Classification Search ........... 707/1–10, 707/100–104, 200–206, 104.1; 711/100, 711/170; 709/201–212, 230–253; 726/1, 726/6–8, 21, 24–26; 700/90
See application file for complete search history.

(56) References Cited

U.S. PATENT DOCUMENTS

| | | | | |
|---|---|---|---|---|
| 4,935,870 A | * | 6/1990 | Burk et al. ................. 709/203 |
| 5,040,141 A | * | 8/1991 | Yazima et al. ............. 709/206 |
| 5,245,532 A | * | 9/1993 | Mourier ...................... 700/90 |
| 5,408,333 A | * | 4/1995 | Kojima et al. .............. 358/400 |
| 5,581,749 A | * | 12/1996 | Hossain et al. ............. 707/10 |
| 5,603,054 A | | 2/1997 | Theimer |
| 5,627,764 A | * | 5/1997 | Schutzman et al. ........ 709/207 |
| 5,632,011 A | * | 5/1997 | Landfield et al. ........... 709/206 |
| 5,768,362 A | * | 6/1998 | Moon .................... 379/355.05 |
| 5,786,817 A | | 7/1998 | Sakano et al. .............. 345/619 |
| 5,893,099 A | * | 4/1999 | Schreiber et al. ........... 707/10 |
| 5,906,656 A | * | 5/1999 | Keller et al. ............... 709/200 |
| 6,088,720 A | * | 7/2000 | Berkowitz et al. ......... 709/206 |
| 6,108,688 A | * | 8/2000 | Nielsen ..................... 709/206 |
| 6,370,566 B2 | * | 4/2002 | Discolo et al. ............. 709/206 |

FOREIGN PATENT DOCUMENTS

| | | |
|---|---|---|
| EP | 0 346 556 | 12/1989 |
| WO | 9311480 | 6/1993 |

OTHER PUBLICATIONS

Gerber, Cheryl; ReliaStar Financial; Computerworld, v4n5; Aug. 1996; pp. 1 and 2.*
"Isocor Adds Message Application Programming Interface Products"; Computergram International, n2398; Apr. 20, 1994; pp. 1 and 2.*
"SecureDelete—a utility to delete files securely", http://www.gammon.com.au/utilities/securedelete.htm (Sep. 14, 1998); 3 pgs.
"Review: Burn It", http://macworld.zdnet.com/pages/april.97/Reviews.3342.html (Sep. 14, 1998); 3 pgs.

(Continued)

*Primary Examiner*—Ella Colbert
(74) *Attorney, Agent, or Firm*—Workman Nydegger

(57) ABSTRACT

A method, apparatus, and article of manufacture for managing electronic records on a computer network is provided. The method provides the steps of creating an electronic tag that uniquely identifies an electronic record, storing the electronic tag, and distributing the electronic record. The method further performs the steps of analyzing a network user's workstation specifications, analyzing a network user's user profile, and generating a reference code, wherein the electronic tag is generated from information analyzed in the network user's workstation specification, the network user's user profile and the reference code.

21 Claims, 40 Drawing Sheets

OTHER PUBLICATIONS

"Content Advisor—Products Page", http://www.contentadvisor.com/products/products.html (Sep. 14, 1998); 1 pg.

"Content Advisor—Corporate Profile", http://www.contentadvisor.com/company/company.html (Sep. 14, 1998); 1 pg.

"SmartFilter—Tour, Monitoring and Control Features", http://www.sctc.com/P_Tool_SF_Tour_monandcont.html (Sep. 19, 1998); 1 pg.

"SF—Key Advantages", http://www.sctc.com/P_Tool_SF_Keys.html (Sep. 19, 1998); 2 pgs.

"SF—Requirements", http://www.sctc.com/P_Tool_SF_Reqs.html (Sep. 19, 1998); 1pg.

"Vendor's Guide to Software Pricing . . . ter Articles on License Management", http://www.globetrotter.com/ms_titl.html (Apr. 7, 1998); 6 pgs.

"No Excuses Licensing", http://www.globetrotter.com/ecs1.htm (Feb. 3, 1998); 5 pgs.

"Seven Steps to Overcome Pricing Un . . . ter Articles on License Management", http://www.globetrotter.com/ms_2do.htm (Apr. 7, 1998) 2 pgs.

"Conceptual description of a generi . . . ter Articles on License Management", http://www.globetrotter.com/ms_lm.htm (May 18, 1998) 3 pgs.

"Press Release—Poulton Associates, Inc.", http://www.poulton.com/ispPR4-98.htm (Sep. 23, 1998), 2 pgs.

"ISPCweb—Poulton Associates, Inc.", http://www.poulton.com/ispcweb.htm (Sep. 23, 1998); 2 pgs.

"As courts increasingly hold firms . . . fast becoming a . . . legal necessity", http://www.drj.com/new2dr/w2_022.htm (Feb. 2, 1998); 5 pgs.

"Risk Analysis Techniques", http://www.drj.com/new2dr/w3_030.htm (Feb. 2, 1998); 8 pgs.

"White papers—Watermarking", http://www.dupont.com/Antron/mark.html (Jul. 16, 1998); 1 pg.

"About Digital Watermarks", http://www.digimarc.com/about_wm.html (Mar. 10, 1998); 4 pgs.

"Digimarc Corporate Series", http://www.digimarc.com/corp_solutions.html (Mar. 10, 1998); 3 pgs.

"Welcome to Digimarc", http://www.digimarc.com/ (Mar. 10, 1998); 2 pgs.

"MarcCentre", http://www.digimarc.com/marc_page.html (Mar. 10, 1998); 1 pg.

"Data Devices International—Tape Backup Procedures and Maintenance", http://www.datadev.com/tapebackup/tapebackup.htm (Sep. 9, 1998); 2 pgs.

"Halebopp Backup Procedures", http://www.gb.nrao.edu/~cmyers/backup.html (Sep. 9, 1998); 2 pgs.

"ISSEL—Intra.doc! Management System", http://www.issel.co.uk/intradoc_ms.html (Feb. 23, 1998); 2 pgs.

"ISSEL—Intra.doc! Architecture", http://www.issel.co.uk/intradoc_architecture.html (Feb. 23, 1998); 2 pgs.

"Intra.doc! Product Suite", http://www.intranetsol.com/products/prodsuit.html (Feb. 23, 1998); 8 pgs.

"Intra.doc! Management System—Web . . . nagement and Enterprise Publishing", http://www.intranetsol.com/products/msbroch.html (Feb. 23, 1998); 4 pgs.

"High-tech Manufacturer Gains Compe . . . With Web-based Document Management", http://www.intranetsol.com/products/success/sshight.html (Feb. 23, 1998) 3 pgs.

Various documents—Tower Software Engineering Pty. Ltd—http://www.ustrim.com (Feb. 19, 1998) 49 pgs.

Various documents—TRIM Version 4.1, Tower Software Engineering Pty. Ltd—http://www.ustrim.com (Feb. 19, 1998); 26 pgs.

"QRMS—Features", http://www.qrms.com/features.htm (Feb. 18, 1998); 19 pgs.

Various documents—Records Center Software, Inc.—http://www.recordsmanager.com/ (Feb. 18, 1998); 11 pgs.

"The TPI Group Inc.—Software Asset Management", http://www.tpi-group.com/whitepapers/wpsasset.html (Feb. 3, 1998); 1 pg.

"The TPI Group—Software Asset Management in a Client Server Architecture", http://www.tpi-group.com/whitepapers/wpsasset.html (Feb. 3, 1998); 11 pgs.

Branscum, D., "bigbrother@the.office.com—Your boss can track every click you make.", *Newsweek*, Apr. 27, 1998, p. 78.

Fox, J., "Compensating your executive team on a shoestring", *Ventures*, Nov. 1997, pp. 14-16.

"Corel WordPerfect Suite 8—Data Formats Supported", White Paper, Aug. 1997 (p. 16).

Schafer, S., "High-Tech Hoods", *Inc. Technology*, vol. 1, 1997; pp. 48-51.

May, A., "Automatic Classification of E-Mail Messages by Message Type", *Journal of the American Society For Information Science*, vol. 48, No. 1., pp. 32-39 (1997).

Takkinen J. et al., "CAFE: A Conceptual Model for Managing Information in Electronic Mail", *IEEE*, pp. 44-53 (1998).

U.S. Appl. No. 10/815,092, filed Mar. 31, 2004, Jacobson.

U.S. Appl. No. 09/104,946, filed Jun. 25, 1998, Jacobson.

U.S. Appl. No. 11/743,590, filed May 2, 2007, Jacobson.

U.S. Appl. No. 10/815,092, Mail Date Mar. 24, 2006, Office Action.

U.S. Appl. No. 10/815,092, Mail Date Jan. 23, 2007, Notice of Allowance.

U.S. Appl. No. 09/104,946, Mail Date Sep. 13, 2000, Office Action.

U.S. Appl. No. 09/104,946, Mail Date Jun. 5, 2001, Office Action.

U.S. Appl. No. 09/104,946, Mail Date Dec. 18, 2001, Office Action.

U.S. Appl. No. 09/104,946, Mail Date Sep. 25, 2002, Office Action.

U.S. Appl. No. 09/104,946, Mail Date Dec. 16, 2003, Notice of Allowance.

U.S. Appl. No. 11/743,590, Mail Date Mar. 18, 2009, Office Action.

May A D: "Automatic Classification of Email Messages by Message Type" Journal for the American Society for Information Science, US, American Society for Information. Washington, vol. 48, No. 1 (Jan. 1, 1997), pp. 32-39, XP00075830 ISSN: 00028231 abstract.

Takkinen J et al: "CAFÉ: A Conceptual Model for Managing Information in Electronic Mail" Proceedings of the Annual Hawaii International Conference on System Sciences, (Jan. 1, 1998), XP000775829 abstract.

Grimm R et al: Computer Networks and ISDN Systems, NL, vol. 28, No. 4, p. 499-511: "Security Policies in OSI-Management Experiences From the Deteberkomproject BMSEC" XP000553075.

* cited by examiner

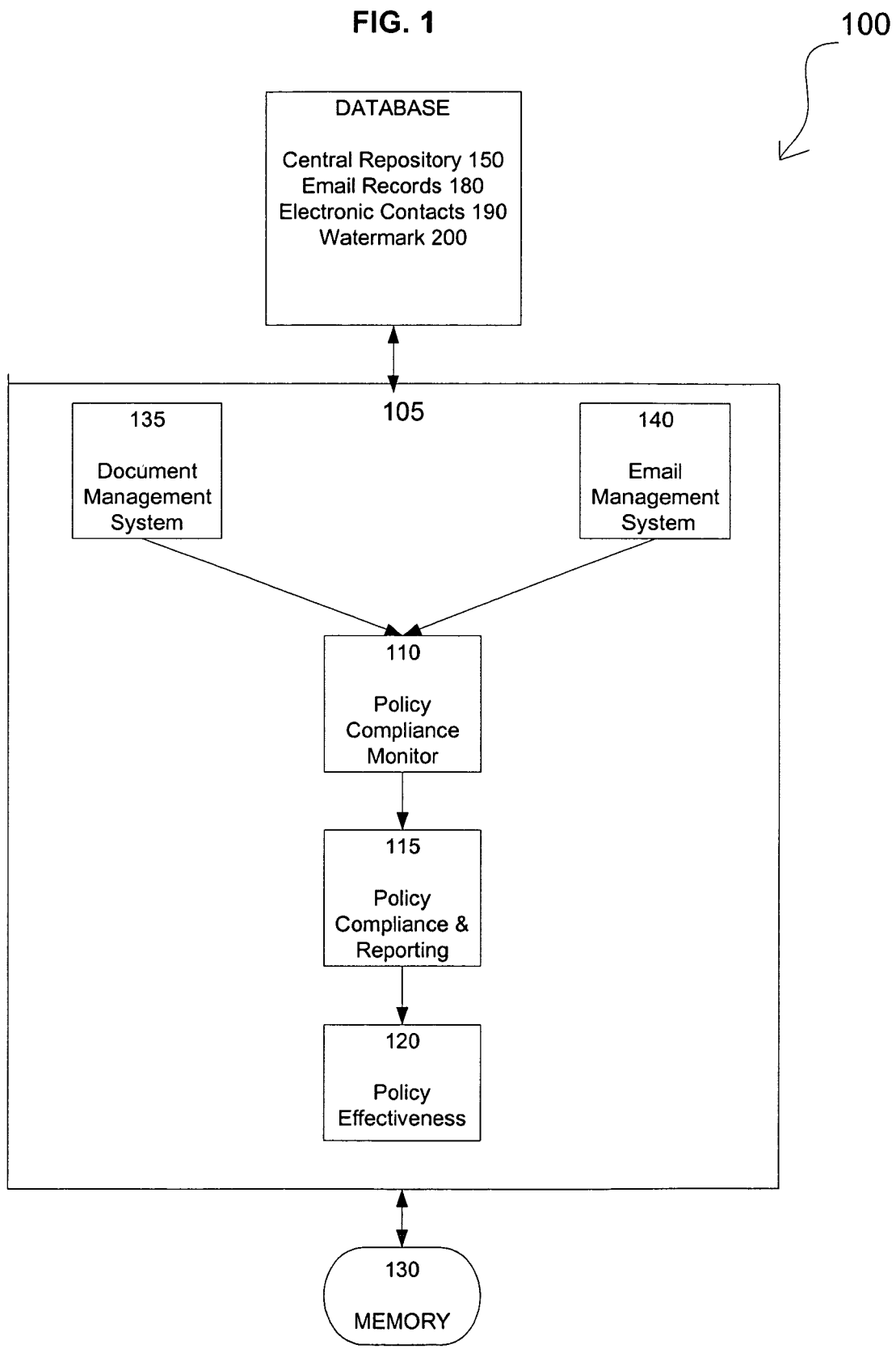

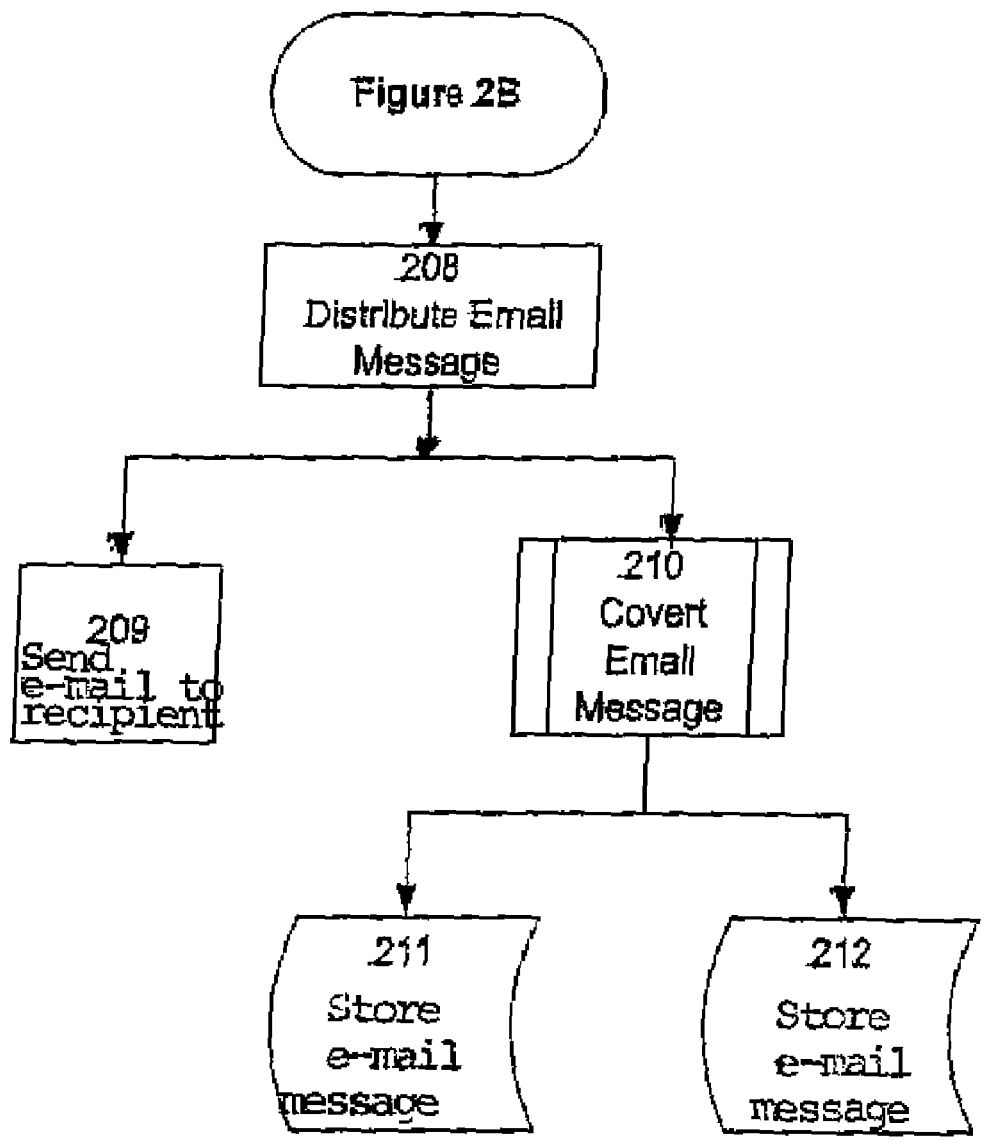

| VIEW TAG |
| HELP |
| SUPPORT SERVICES |
| HOW TO |

FILE  EDIT  MESSAGE  TRANSFER  MAILBOX  SETTINGS  SPECIAL  HELP

*EMAIL TAG*

REFERENCE CODE: _____
SOFTWARE USED (AUTO) _____
SOFTWARE VERSION (AUTO) _____
OTHER STORAGE MEDIA _____
WORKSTATION OF ORIGIN (AUTO) _____
DOCUMENTS ORIGINAL VERSION (AUTO) _____
PREPARED BY (AUTO) _____
PASSWORDS AND LOG IN VERIFICATION (AUTO) _____
TYPE OF DOCUMENTS (DROP DOWN MENU) _____
(LEGAL, CORRESPONDENCE, PERSONNEL, ACCOUNTING, FINANCE, OTHER)

CLIENT NAME _____ (DROP DOWN MENU)
CLIENT # _____ SCAN MATCH THE CLIENT NAME
PROJECT# _____ SCAN CLIENT NAME AND CLIENT #
PURPOSE OF DOCUMENT (DROP DOWN BOX) _____
DATE (AUTO) _____
TIME (AUTO) _____
FILL IN BOX FOR TEXT NOTES _____
DOCUMENT VERSION NUMBER _____
(AUTO IF YOU USE SAVE AS COMMAND)
AUTHORITATIVE VERSION    YES    NO
CROSS REFERENCED TO: (LIST DOCUMENT CODES IN DROP DOWN MENU, CLICK MENU FOR FURTHER INFORMATION)

10/20/98

◁ PREVIOUS | NEXT ▷ | PRINT ▷

FIG. 8A

EMAIL TAG

FILE  EDIT  MESSAGE  TRANSFER  MAILBOX  SETTINGS  SPECIAL  HELP

REFERENCE CODE: _____
WORKSTATION OF ORIGIN (AUTO) _____
DOCUMENTS ORIGINAL VERSION (AUTO) _____
PREPARED BY (AUTO) _____
DIVISION/DEPARTMENT _____
NETWORK USER'S EMPLOYMENT NUMBER (AUTO) _____
USER PASSWORDS AND LOG IN VERIFICATION (AUTO) _____
CLIENT NAME _____ (DROP DOWN MENU)
CLIENT# _____ SCAN MATCH THE CLIENT NAME
PROJECT# _____ SCAN CLIENT NAME AND CLIENT #
PURPOSE OF DOCUMENT (DROP DOWN BOX) _____
DATE(AUTO) _____
TIME(AUTO) _____
DOCUMENT VERSION NUMBER _____
(AUTO IF YOU USE SAVE AS COMMAND)
AUTHORITATIVE VERSION   YES ___   NO ___
CROSS REFERENCED TO: (LIST DOCUMENT CODES IN DROP DOWN MENU, CLICK MENU
FOR FURTHER INFORMATION)  _____
TYPE OF DOCUMENTS (DROP DOWN MENU) _____
(LEGAL, CORRESPONDENCE, PERSONNEL, ACCOUNTING, FINANCE, OTHER)
NOTES: _____

VIEW TAG
HELP
SUPPORT SERVICES
HOW TO

◁ PREVIOUS | NEXT ▷ | PRINT ▷       10/20/98

FIG. 8B

EMAIL TAG

FILE   EDIT   MESSAGE   TRANSFER   MAILBOX   SETTINGS   SPECIAL   HELP

REFERENCE CODE: _____
CLIENT NAME _____ (DROP DOWN MENU)
CLIENT # _____ SCAN, MATCH THE CLIENT NAME
PROJECT# _____ SCAN CLIENT NAME AND CLIENT #
PURPOSE OF DOCUMENT (DROP DOWN BOX) _____
DATE (AUTO) _____
TIME (AUTO) _____
SOFTWARE USED (AUTO) _____
SOFTWARE VERSION (AUTO) _____
WORKSTATION OF ORIGIN (AUTO) _____
DOCUMENTS ORIGINAL VERSION (AUTO) _____
PREPARED BY (AUTO) _____
PASSWORDS AND LOG IN VERIFICATION (AUTO) _____
DOCUMENT VERSION NUMBER _____
(AUTO IF YOU USE SAVE AS COMMAND)
AUTHORITATIVE VERSION   YES ___   NO ___
CROSS REFERENCED TO: (LIST DOCUMENT CODES IN DROP DOWN MENU, CLICK MENU FOR FURTHER INFORMATION) _____
TYPE OF DOCUMENTS (DROP DOWN MENU) _____
(LEGAL, CORRESPONDENCE, PERSONNEL, ACCOUNTING, FINANCE, OTHER)
NOTES: _____

VIEW TAG
HELP
SUPPORT SERVICES
HOW TO

◁ PREVIOUS | NEXT ▷   | PRINT ▷         10/20/98

BUSINESS EMAIL

FILE  EDIT  MESSAGE  TRANSFER  MAILBOX  SETTINGS  SPECIAL  HELP

REFERENCE NUMBER: BEM 14722

POSTED-DATE: MON 18 MAY 1998 16:17:36 -0500 (CDT)
TO: ANDREA JACOBSON <VIRT@VWI.COM>
FROM: JANE DOE <JDOE@VWI.COM>
SUBJECT: NEW CLIENT INFORMATION
ATTACHMENTS:
CC:
BCC:

ANDREA,

I AM SENDING YOU INFO ON OUR NEW CLIENT.

SEE ATTACHED FILE.

JANE

VIEW TAG

HELP
SUPPORT SERVICES
HOW TO

◁ PREVIOUS | NEXT ▷   ◁ PRINT ▷   ◁ SEND ▷   10/20/98

FIG. 15

E-PROPOSAL

FILE  EDIT  MESSAGE  TRANSFER  MAILBOX  SETTINGS  SPECIAL  HELP

REFERENCE NUMBER: PRO 14722

POSTED-DATE: MON, 18 MAY 1998 16:17:36 -0500 (CDT)
TO:                ANDREA JACOBSON <VIRT@VWI.COM>
FROM:              JANE DOE <JDOE@VWI.COM>
SUBJECT:           PROPECT PROPOSAL PROCESS & INFORMATION
ATTACHMENTS: E-PROPOSAL
CC:
BCC:

ANDREA,

ATTACHED IS A COVER LETTER EXPLAINING OUR E-PROPOSAL AND CONTRACT POLICIES, PROCEDURES AND TERMS. PLEASE REVIEW THE ATTACHMENT CAREFULLY AND CONTACT US IF YOU HAVE ANY QUESTIONS OR CONCERNS.

WE LOOK FORWARD TO WORKING WITH YOU.

JaneJones
ACCOUNT MANAGER

VIEW TAG
HELP
SUPPORT SERVICES
HOW TO

PREVIOUS  NEXT    PRINT    SEND    10/20/98

ELECTRONIC RECORD MANAGEMENT SYSTEM

BACKGROUND

1. Field of the Invention

The Present Invention relates in general to networked computing systems, and more particularly, to a system for managing electronic records.

2. Description of Related Art

Communication by Electronic Mail (E-mail) is a fast and convenient form of communication in the workplace. It is universally transforming the way organizations—such as corporations, partnerships, LLCs, etc.—communicate, and is rapidly spawning court cases regarding workplace privacy and monitoring, intellectual property, network security, electronic commerce, freedom of expression, harassment and safety.

Electronically-stored data, such as e-mail, is often sought by opposing parties in litigation and by criminal justice authorities, since, in many cases, it may be the only record of a conversation or transaction. For purposes of evidence, both State and Federal Courts have concluded that e-mail is a special form of a computer record and can be considered an official "record" of an organization. Consequently, e-mail is rapidly becoming a critical information source in litigation. Recent cases have found "smoking guns" in old e-mail and early drafts of organizational documents. The early documents may not be binding, but may sometimes be used to establish intent on behalf of the organization, as well as the mind set of the author at the time the document was created.

Nevertheless, many organizations have no means by which to manage their e-mail. E-mail is a record. Most organizations, further, do not have in place a system to index their e-mail messages with other client-related documents. Finally, many organizations do not have a system to record, store and purge e-mail messages in the same manner as they manage their traditional records. Consequently, the lack of such systems are creating enormous risks for these organizations, and subjecting the organizations to liability.

Additionally, most organizations have no control over, and in some cases, do not have a record of, any documents sent as e-mail attachments to outside computer systems (and organizations). Employees often view e-mail as the equivalent to a private conversation. Furthermore, statements made in e-mails may or may not reflect the official position of the organization. Rather, these statements reflect preliminary thoughts or ideas that have not been reviewed by the organization, and typically only reflect the personal opinion of the parties involved. Yet, since employees of the organization create these communications, Court and Regulatory Agencies may conclude these records reflect the official view of the organization. In addition, personal e-mail messages created by employees may not be the type of e-mail messages an organization may wish to record and retain in their records management system. Currently, there is no system to separate personal e-mail from business e-mail.

Most organizations have not yet determined the records retention periods and procedures for e-mail, and have not established procedures to delete e-mail from back-up systems. Information System (IS) Managers (or Information Technology (IT) persons) generally develop elaborate procedures to backup and preserve e-mail records for many years. Some IS and IT persons believe that information should be baked-up, or saved, for long periods of time, believing that "longer is better." Even with short back-up cycles, messages may still be maintained due to poor procedures for erasing or recycling the various back-up systems. Further, even when back-up systems have been erased, overwritten or damaged, experts using sophisticated techniques may still be able to recover the information for litigation.

The concept of e-mail is still new enough that organizations who want to establish their own guidelines do so "on their own" or "a their own risk," since no industry standard currently exists.

Therefore, there is a need for an electronic records management system to track, sort, index, manage, authenticate, purge and store e-mail messages, along with other documents, in a database to insure that the e-mail messages retained in the database may be the e-mail messages an organization chooses to retain as their official records versus unorganized messages that may have the potential to create a liability for the organization. There is a further need for an electronic records management system that grants the senders and receivers of e-mail messages greater control over how their e-mail messages may be sent, received, tracked and purged.

SUMMARY OF THE INVENTION

To overcome the limitations described above, and to overcome other limitations that will become apparent upon reading and understanding the present specification, the Present Invention discloses a method and apparatus for managing electronic records. A system in accordance with the principles of the Present Invention performs the steps of creating an electronic tag that uniquely identifies an electronic record, storing the electronic tag and distributing the electronic record. The method further performs the steps of analyzing a network user's workstation specifications, analyzing a network user's user profile and generating a reference code, wherein the electronic tag is generated from information analyzed in the network user's workstation specification, the network user's user profile and the reference code.

One aspect of the preferred embodiment of the Present Invention includes a system that provides for the selective purging of electronic records. The sender may determine whether an electronic record is purgeable or not purgeable by the recipient. Alternatively, the system may determine the purge characteristics of a particular electronic record based on the information stored in the electronic tag and related to that electronic record.

These and various other advantages and features of novelty which characterize the Present Invention and various preferred embodiments are pointed out with particularity in the Claims which are annexed hereto and which form a part hereof. However, for a better understanding of the Present Invention, its advantages and the objects obtained by its use, reference should be made to the Figures which form a further part hereof, and to the accompanying descriptive matter, in which there is illustrated and described specific examples of the method, system and apparatus in accordance with preferred embodiments of the Present Invention.

BRIEF DESCRIPTION OF THE FIGURES

Referring now to the Figures in which like reference numbers represent corresponding parts throughout:

FIG. 1 represents a block diagram illustrating an Electronic Record Management System according to an embodiment of the Present Invention;

FIGS. 2A-2C represent flow diagrams depicting an e-mail distribution process;

FIGS. 8A-8C represent an exemplary screen displays illustrating an electronic tag;

FIG. 9 represents an exemplary screen display illustrating a business e-mail screen;

FIG. 15 represents an exemplary screen display illustrating an e-mail proposal screen;

FIG. 16 represents an exemplary screen display illustrating an e-mail proposal confirmation screen;

FIG. 24 represents an exemplary screen display illustrating a screen to request an e-mail record;

DETAILED DESCRIPTION OF THE INVENTION

Figure 2A:
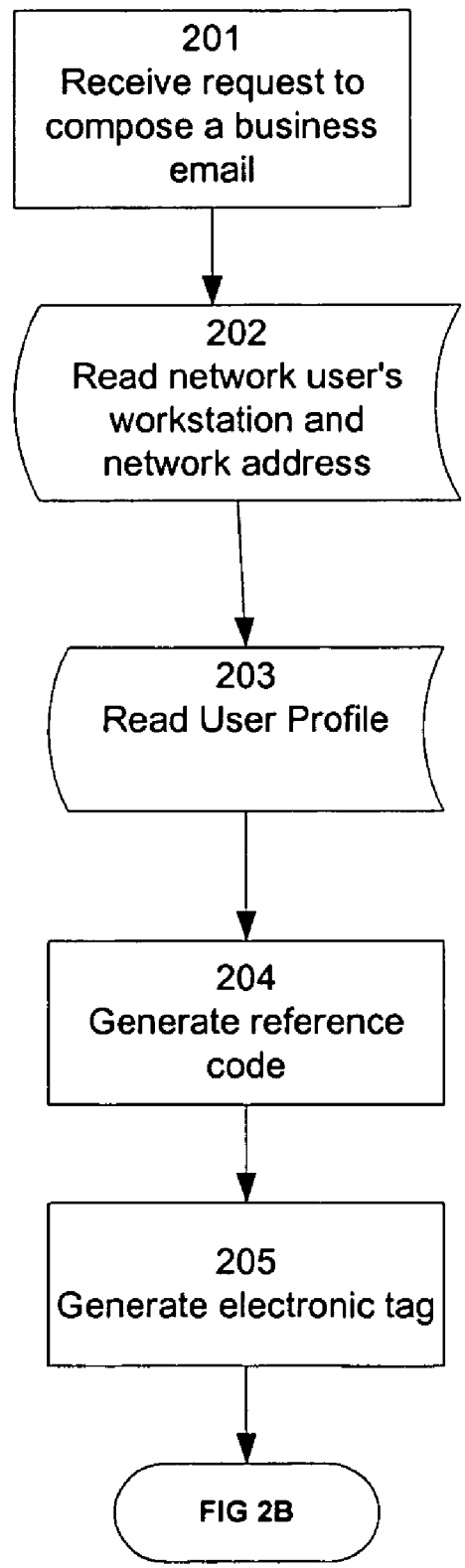

In the following description of the exemplary embodiments of the Present Invention, reference is made to the accompanying Figures that form a part hereof, and in which is shown, by way of illustration, a specific embodiment in which the Present Invention may be practiced. It is to be understood that other embodiments may be utilized and that structural changes may be made without departing from the scope of the Present Invention.

The Present Invention provides a method and apparatus for maintaining policy compliance on a computer network. Additionally, the Present Invention provides for an article of manufacture, comprising a computer-readable storage medium having a computer program embodied therein, for maintaining policy compliance on a computer network. FIG. 1 is a block diagram illustrating an electronic record management system according to an embodiment of the Present Invention. The hardware, generally implementing electronic record management system 100, may include a computer having processor 105 and memory 130 distributed over a network as is well-known in the art. Memory 130 may include Random Access Memory (RAM) or fixed storage. The program steps implementing this invention are stored in memory 130 and executed by processor 105. The present invention may be implemented using an Intranet-based application that can be stored on central servers, waiting to be called up and manipulated via a Web browser from any location. Those skilled in the art will recognize that a variety of configurations can be used without departing from the scope of the present invention and that a wide variety of distributed and multi-processing systems may be used.

A document management system 135 and E-Mail Management System 140 may be included and may feature an electronic tag for maintaining historical records for documents within Systems 135 and 140. The document management system 135 and E-Mail Management System 140 may both reside on an Intranet and the documents may be in HTTP format. The documents from Systems 135 and 140 may be filed in a central repository database 150.

E-Mail Management System 140 manages e-mail records. E-Mail Records Database 180 may contain a read-only copy of e-mail messages generated from E-Mail Management System 140 that may only be accessed by an encryption key. A watermark database 200 marks and authenticates an e-mail message that has been stored in E-Mail Records Database 180. Electronic Contracts Database 190 stores and records e-mail contracts and their status. An e-mail records retention module of the policy compliance monitor 110 provides system administrators with a checklist of procedures to execute as part of managing E-Mail Management System 140. The policy effectiveness module 120 monitors network user e-mail policy compliance. Each of the blocks of FIG. 1 will be introduced, followed by a detailed explanation of each block.

Block 110 represents a policy compliance monitor for monitoring compliance across the network.

Block 115 represents a policy compliance and reporting module for managing information received from the compliance monitor.

Block 120 represents the policy effectiveness module, which is intended to manage the policy compliance monitor 110.

Block 130 represents a database or memory for storing policy and compliance information.

Block 135 represents the document management system of the compliance monitor 110.

Block 140 represents the e-mail management system of the compliance monitor 110.

The document management system 135 assigns an electronic tag to all documents. The electronic tag is a method to track and index documents in a central repository residing on an Intranet web server. The electronic tag also provides a method to track documents sent as e-mail file attachments.

FIGS. 8A-C illustrate examples of electronic tags, as contemplated in accordance with the Present Invention.

E-Mail Management System 140 uses electronic reference codes embedded in electronic tags to track, index, record, store and purge e-mail messages with other, client related documentation in a central database. An electronic tag provides a method to track and index e-mail messages in a central repository. The electronic tag also provides a method to retain an authentic record of all business e-mail messages sent and received by the organization.

Figure 4:
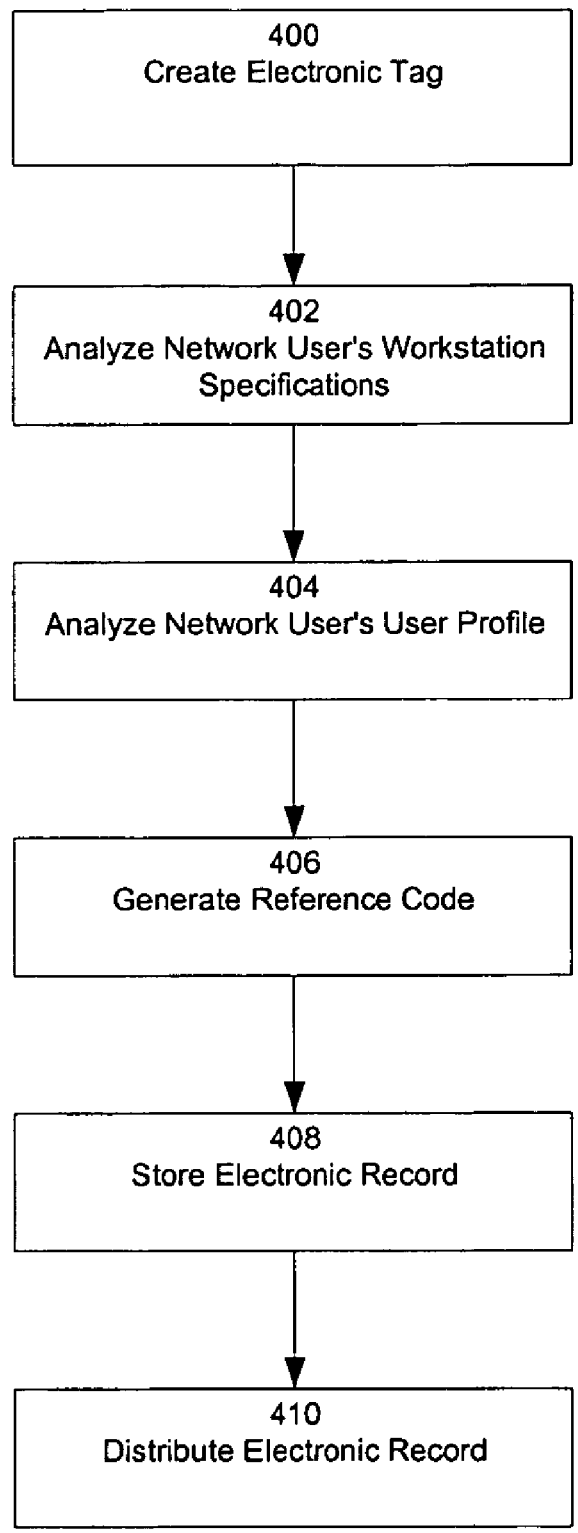
FIG. 4 represents a block diagram illustrating the steps performed by the Electronic Record Management System according to an embodiment of the Present Invention.

The present invention discloses a method and apparatus for maintaining policy compliance on a computer network. FIG. 4 is a block diagram illustrating the steps performed by electronic record management system 100 according to an embodiment of this invention. Block 400 represents E-Mail Management System 140 creating an electronic tag that uniquely identifies an electronic record. Block 402 represents E-Mail Management System 140 analyzing a network user's workstation specifications. Block 404 represents E-Mail Management System 140 analyzing a network user's user profile. Block 406 represents E-Mail Management System 140 generating a reference code, wherein the electronic tag is generated from information analyzed in the network user's workstation specification, the network user's user profile, and the reference code. Block 408 represents E-Mail Management System 140 storing the electronic tag. Block 410 represents E-Mail Management System 140 distributing the electronic record.

One preferred embodiment of the present invention includes a system that provides for management functions related to electronic records, such as the selective purging of e-mails. The sender or may determine whether an e-mail is purgeable or not purgeable by the recipient. Alternatively, the system may determine the purge characteristics of a particular e-mail based on the information stored in the electronic tag.

The policy compliance monitor 110 works with the policy effectiveness module 120 to provide network user compliance monitoring with network security policy stored in a database, it electronically evaluates network security policy compliance based on network user compliance, and it undertakes a network policy compliance action in response to network security policy compliance. Network user compliance monitoring is defined as monitoring network activity to insure users are in compliance with the organization's network security policies. Network security policies typically include a set of rules designed to limit an organization's risk and liability.

The policy compliance and reporting module 115 provides automated policy monitoring as well as policy violation procedures and reporting. It also tracks policy investigations and generates policy investigation reports. These procedures work in conjunction with existing policy compliance reporting, discipline and grievance procedures to uphold the organization's technology policies. The policy compliance and reporting module 115 monitors and records user and network system activities, audit procedures and reporting, policy violation procedures/investigations/reporting, compliance/non-compliance status reporting.

The policy effectiveness module 120 electronically collects, records, analyzes and stores information from policy compliance monitoring, analyzes policy compliance and reporting, evaluates network policy compliance actions undertaken in response to the network security policy violations and electronically implements a different network security policy selected from network security policies stored in a policy database. The policy effectiveness module 120 analyzes information collected from the policy compliance and reporting module 115 to determine if network user compliance policies are effective. If a policy is determined to be ineffective, a new policy may need to be implemented.

A sample policy compliance monitor, policy compliance and reporting module, and policy effectiveness module are disclosed in application Ser. No. 09/104,946, entitled "NETWORK POLICY MANAGEMENT AND EFFECTIVENESS SYSTEM," filed on Jun. 25, 1998, by Andrea M. Jacobson, which application is incorporated by reference herein.

E-Mail Management System

Electronic record management system 100 may include E-Mail Management System 140. E-Mail Management System 140 may include existing e-mail systems, such as a Lotus Notes® system. E-Mail Management System 140 may be a web-based application that assigns an electronic tag with a reference number to all e-mail messages originating from the organization. Typical e-mail messages created in and read by E-Mail Management System 140 are HTTP standard. Accordingly, such documents may be created and retained in HTML format and may utilize an HTML interface that may be read by any web browser. Alternatively, e-mail documents may be stored on file servers in text formats such as those readable by word processing and office suite products. In the preferred embodiment, all e-mail messages typically are stored on intranet web servers instead of the file servers in word processing and office suite products. This allows sophisticated HTML and JavaScript based e-mail forms and the back end application development capabilities of HTTP servers and the World Wide Web. A system administrator -may configure who can read, edit and access each document or directory of documents as demonstrated with existing Internet. access and security protocols.

In E-Mail Management System 140, e-mail may include text, graphics and audio/video communications. E-Mail Management System 140 typically provides e-mail reference codes, and such e-mail reference codes may include, for example: Business e-mail codes, personal e-mail mail codes, Intranet e-mail messaging, message purging codes, minute e-mail codes, limited e-mail codes and a bulletin board for internal, broadcast e-mail messages. The functionality of E-Mail Management System 140 may be based on user-definable e-mail reference codes set forth by an organization's network policies.

An organization's network policies may define how, what and if e-mail messages may be registered with E-Mail Management System 140 at the creation stage or purged by E-Mail Management System 140. An electronic tag may be attached to all e-mail message templates. An electronic tag is a set of data stored with an e-mail message in E-Mail Records Database 180. The electronic tag includes information fields that may provide a method to centrally index, search, store, monitor and record e-mail messages with other documents, track and record e-mail history, monitor policy compliance including access to and disclosures of documents sent as e-mail file attachments, and may determine the destruction of e-mail documents. Typically, an e-mail header may contain fields for a recipient's address, sender's address, subject, copy and blind copy. An electronic tag may contain a sender's workstation specifications, including but not limited to, the software used to create the e-mail, the version of the software used to create the e-mail, workstation serial number, date, time and workstation model number. The electronic tag may include network user information obtained from the network user's User Profile. Network user information may include, but is not limited to, employee identification number, network access code, department/division information, title, password, login verification, workstation specs and mailstop. FIGS. 8A-C are exemplary screen displays illustrating the electronic tag according to one embodiment of the invention.

For example, an organization may require a network user to have approval from upper management in order to purge e-mail messages. Another optional policy is to require all internal e-mail messages be to be purged daily, so that no internal record is maintained. Another policy may be to monitor personal e-mail message to insure that network users are not conducting business for personal gain. Therefore, the functionality of the system may be based on user-definable e-mail reference codes set forth by an organization's network policies.

E-mail policy options may be integrated into the policy compliance monitor 110 and the document management system 135 so that all e-mail messages, originating from within the organization can be indexed, recorded, retrieved, tracked and purged in the central repository database of the document management system 135. Further, all e-mail messages may be assigned an electronic tag which may be copied to, recorded and retrieved from intranet web servers of the document management system 135 and may be measured for policy compliance by the policy compliance monitor 110.

E-mail Reference Codes

An e-mail message may be assigned an electronic tag. An electronic tag typically contains several information fields that collect and track an e-mail's history, including, but not limited to, tracking the number off copies and revisions, who made a copy and when, and may contain a reference code. The e-mail reference code may be comprised of text letters (i.e., text value) and a numeric value. The text value may tell the system how to process the e-mail message. The numeric value may be used to identify and track the e-mail to the master file. The numeric value may correlate the e-mail to a master file stored in the central repository. If a network user chooses the minute mail option, a function that allows senders and receivers of e-mail messages to send, receive or purge e-mails from E-Mail Management System 140 without a record of the message being retained by the sender, receiver or the log file of E-Mail Management System 140, the numeric number may be the network user's employee identification number paired with a text code, e.g., MMM. E-mail reference codes are also used to tell the system how to process e-mail, and as a method to track and identify the e-mail within the system. E-mail reference codes may be used to process e-mail contracts, personal e-mail, business e-mail, bulletin board e-mail, intranet e-mail, identify and track incoming e-mail, store- and retrieve e-mail messages via search engines from the central repository database and/or the e-mail records database.

A reference code may be comprised of text letters (i.e., text value) and a numeric value. The numeric value may be used to identify and track the e-mail to the master file. The text value may trigger an object and tell it how to process the e-mail message. An object has specific characteristics and may carry out specific actions that are triggered by an event and is stored in Electronic Contracts Database 190. In E-Mail Management System 140, the object is a self-contained unit of functionality whose specific actions are triggered when a text value matches an e-mail reference code. Once the object and the text code are matched, the text code triggers the object to receive instructions from a script language. Every object typically has attached to it a script that contains the procedures used to manipulate the object. Therefore, the type of e-mail reference code entered into the reference code field determines the object that will be used.

The type of e-mail reference code may also determine the purge options for an e-mail message. The sender typically may define an e-mail message as purgeable or not purgeable by the recipient. Alternatively, the type of e-mail reference code may determine whether an e-mail message is purgeable.

Figure 5:
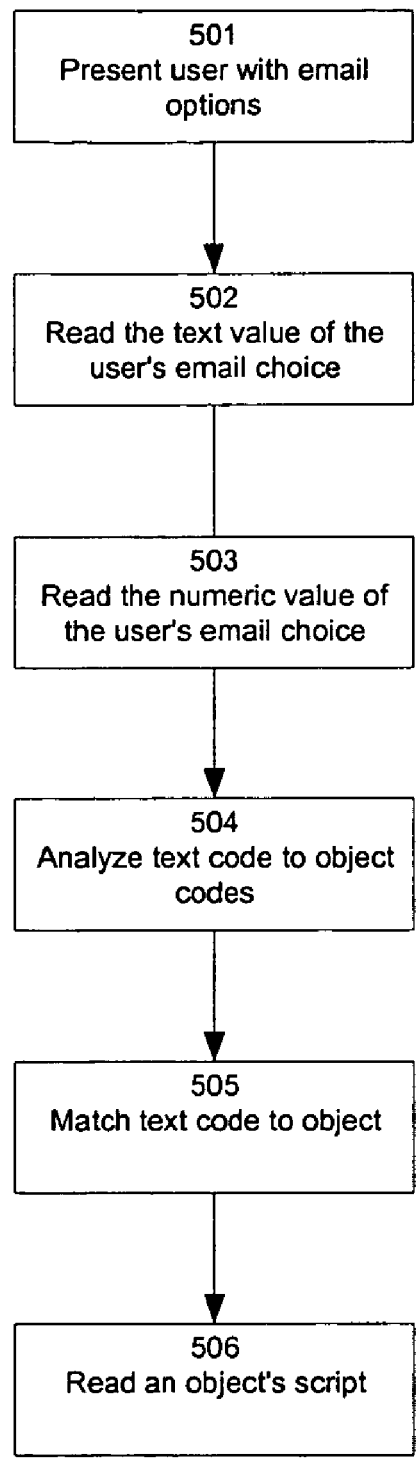
FIG. 5 represents a flow diagram illustrating E-Mail Management System reading and executing a reference code of an electronic record.

FIG. 5 is a flow diagram illustrating E-Mail Management System 140 reading and executing an e-mail's reference code. Typically, a network user may choose the type of e-mail message he desires to send from the e-mail message menu in the e-mail application. Block 501 represents E-Mail Management System 140 presenting the user with e-mail options. The type of e-mail message the network user chooses is represented by a text value that may appear in the reference code of the e-mail's electronic code. Block 502 represents E-Mail Management System 140 reading the text values of the user's e-mail choice. A numeric value is also paired with the text value to create the reference code for the e-mail. Block 503 represents E-Mail Management System 140 reading the numeric value of the user's e-mail choice.

A sorting algorithm may be responsible for reviewing text values and matching it to an object. Block 504 represents E-Mail Management System 140 analyzing text code and object codes. The text value may determine the functions the object will execute. E-Mail Management System 140 analyzes the text value in relation to the objects in Electronic Contracts Database 190. If the text values are equal, E-Mail Management System 140 chooses the object and begins reading the object's scripting language.

Block 505 represents E-Mail Management System 140 matching the text code to an object. The scripting language contains the procedures for handling the e-mail message. Block 506 represents E-Mail Management System 140 reading an object's script.

For example, an organization may determine that the letters MMM and a master file number may be used as the e-mail reference code for minute mail. When the network user having an employee number of 1030 decides to send an e-mail, he may enter the code MMM1030 into the e-mail reference code field in the electronic tag of an e-mail message. When the network user sends the e-mail message, E-Mail Management System 140 may read the e-mail's electronic tag, and may begin executing the scripting code within the application. Each scripting code typically correlates to an e-mail reference code and activates an object.

E-Mail Management System 140 may read the e-mail's electronic tag, the network user's user profile and the identity of the network user's workstation (e.g., the Win95 registry). E-Mail Management System 140 may read the workstation's local machine which may include fields depicting settings specific to the machine and settings specific to the network user from the workstation's operating system. Machine settings may include the hardware profile, including serial number, system specifications, software, including licensed software, non licensed software (i.e., personal software installed by the network user), software drivers, memory status, system diagnostics and other information. Network user information may include the network systems logon status, access status (e.g., remote access or local), network status, software configurations and other user definable information fields.

Next, E-Mail Management System 140 may read several fields from the network user's user profile, including the network user's name, network user's e-mail address, network user's surface mail address, employment status (i.e., temp, contract, virtual), title, department, organizational chart indicating who the network user reports to, the direct reports, his assistant, mail station address and employee identification number. E-Mail Management System 140 may also read system information, which may include hardware information including, but not limited to, serial number, system specifications, software including licensed software, non licensed software (i.e., personal software installed by the network user), software drivers, memory status, system diagnostics, software information included but not limited to software configurations, licensed software, non licensed software, logon status, network user's system access, security status, and any special network access or privileges (i.e., using network for charitable uses.), system compliance status and other user definable information fields.

Next, E-Mail Management System 140 may read the e-mail reference code and determine that the e-mail is a minute mail, e.g., text value of MMM. The MMM may trigger an object to carry out its specific actions. In this case, E-Mail Management System 140 may send the e-mail message to the recipient. The object may apply font and color changes to the e-mail. After the recipient has opened and received the e-mail message, E-Mail Management System 140 may allow the network user to view the e-mail message for a minute, or other period of time. After the time has elapsed, the message may disappear from the screen and E-Mail Management System 140 may begin to purge the e-mail message from the network user's e-mail application, the sender's e-mail application and the e-mail log file. E-Mail Management System 140 may read the sender's e-mail address field, recipient's e-mail address field, subject. field, time and date field, and copy fields of an e-mail's electronic tag. Next, E-Mail Management System 140 may read the e-mail server log file. E-Mail Management System 140 may use a sorting algorithm to search for the e-mail header fields to match the sender's e-mail address field, recipient's e-mail address field, subject field, time and date field, and copy fields of an e-mail's electronic tag. Once the exact e-mail entry is found, E-Mail Management System 140 may purge the e-mail message by deleting the entry from E-Mail Management System 140. Next, E-Mail Management System 140 may read any back up tapes, other storage media or any copies of the e-mail that may have been listed in the copy field of the e-mail or forwarded to other recipients. E-Mail Management System 140 may use a sorting algorithm to search for the e-mail header fields to match the sender's e-mail address field, recipient's e-mail address field, subject field, time and date field, and copy fields of an e-mail's electronic tag. Once the exact e-mail entry is found, the object may purge the e-mail message from E-Mail Management System 140 by deleting the entry from the system. E-Mail Management System 140 records the purging process in Electronic Contracts Database 190. E-Mail Management System 140 sends a final message to the sender and the recipient to indicate the purging process is completed.

Business E-Mail Reference Code

E-mail is a record that an organization may need to retain as a record. A business e-mail is defined as an e-mail message that an organization may want to retain because it is a record of the organization's business. This may include e-mail messages representing client correspondence, transactions or other e-mails containing valuable information the organization desires, or is required to retain as a record. FIG. 9 illustrates an example of a business e-mail contemplated in accordance with the Present Invention.

E-Mail Management System 140 assigns an electronic tag with an e-mail reference code to all business e-mail messages to assist in index, record, store, search, retrieve and dispose of the e-mail records.

Figure 2B:
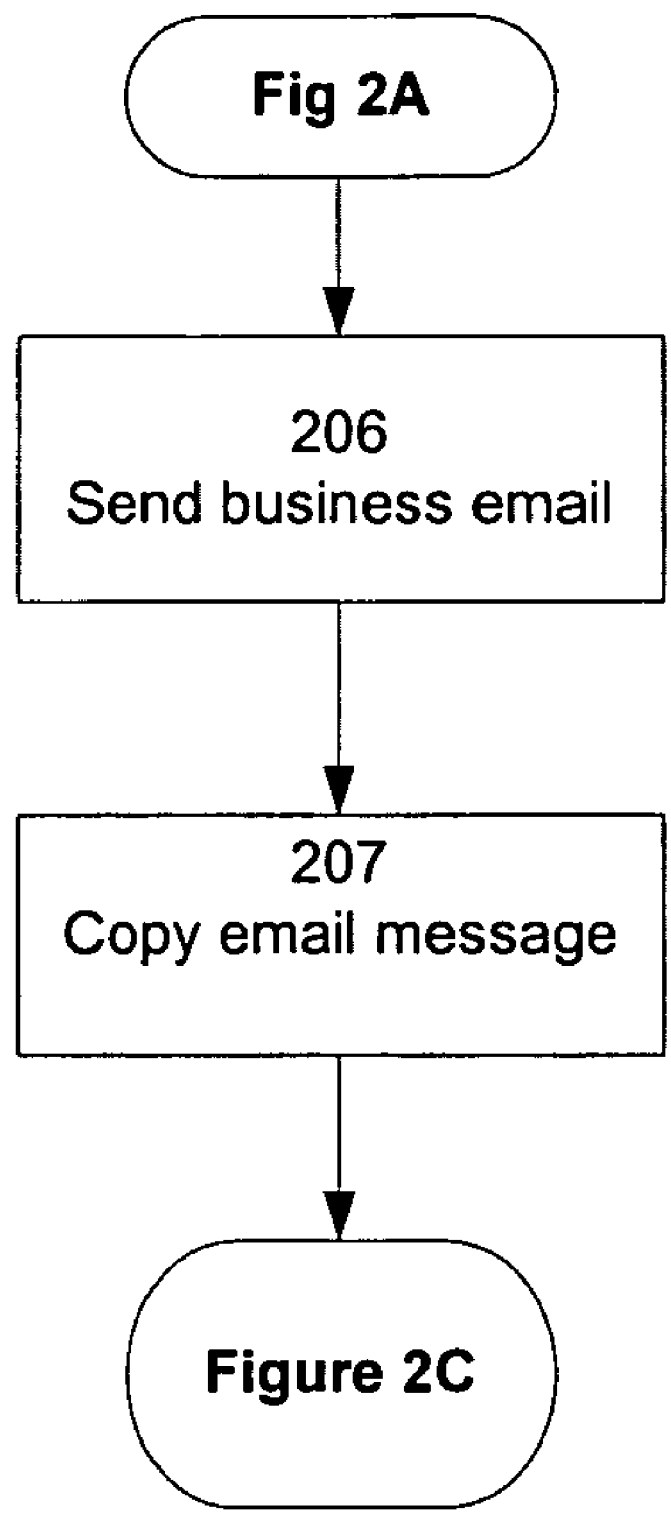

FIGS. 2A through 2C are flow diagrams depicting an e-mail distribution process. In an exemplary embodiment, the e-mail message may be a business e-mail message. Block 201 represents E-Mail Management System 140 receiving a request from the network user to compose a business e-mail message. FIG. 9 is a screen display illustrating a typical business e-mail screen. The network user selects an e-mail page to identify the type of e-mail message the user may compose. E-mail pages may include business e-mail, personal e-mail, Intramail and bulletin board mail.

E-Mail Management System 140 reads the network user's workstation specifications. Block 202 represents E-Mail Management System 140 reading the network user's workstation and network address. For example, when utilizing a Microsoft Windows operating system, E-Mail Management System 140 may read the network user's operating system registry, which may be a tree-structure, hierarchical database where the system and programs store data. The registry may be stored in two files. The actual files used can vary based upon configurations of the system but will generally be split into a file having settings specific to the machine (typically system.dat) and a file having settings specific to the user (typically user.dat.) from the workstation's operating system.

E-Mail Management System 140 reads the workstation's local machine which may include fields depicting settings specific to the machine and setting specific to the network user from the workstation's operating system. Machine settings may include hardware profile including serial number, system specifications, software including licensed software, non licensed software (i.e., personal software installed by the network user), software drivers, memory status, system diagnostics and other information. Network user information may include the network systems logon status, access status (e.g., remote access or local), network status, software configurations and other user definable information fields.

E-Mail Management System 140 may read fields from the network user's user profile. Block 203 represents E-Mail Management System 140 reading a network user's user profile.

An organization may use an indexing system to identify work tasks. For example, the organization may track information on a client or project basis. All clients or projects in E-Mail Management System 140 may be assigned a reference code, and a master file number may be assigned to all project, entity and/or business files listed in E-Mail Management System 140. In the preferred embodiment, a new master file is created and entered into E-Mail Management System 140 in a manner similar to that used by Microsoft products, e.g., the creation of a New folder or file. In E-Mail Management System 140, when a master file is established it is typically replicated in the e-mail records database. In the preferred embodiment, a master file is replicated in a manner similar to that of replicating a database in the Lotus Notes® system.

After the user has composed an e-mail and has clicked on the send icon in an e-mail application, E-Mail Management System 140 typically presents the user with a menu listing files in the central repository database. The user may select the file in the central repository database in which to store a copy of the e-mail message. After the user has chosen the location to store the e-mail message in the central repository, E-Mail Management System 140 typically reads the master file number field from the file in the central repository. The master file number and the e-mail Intranet web site may be used to generate a reference code for the business e-mail. If the e-mail message is a business e-mail, the system may assign the letters BEM to the beginning of the reference code. Block 204 represents E-Mail Management System 140 generating the reference code.

For example, if a user has composed a business e-mail message, he may choose to index and store the business e-mail. The user may indicate the file where the e-mail messages is to, be stored. E-Mail Management System 140 may read the master file number from the location where the network user wishes to store the business e-mail message. Next, E-Mail Management System 140 may read the Intranet site to determine the type of e-mail message the user has composed. Therefore, if a master file code is 1000 and E-Mail Management System 140 determines that the network user composed an e-mail message from the business e-mail Intranet site, the reference code for the business e-mail electronic tag may be BEM1000. This reference number may be used by E-Mail Management System 140 to index and track the e-mail in E-Mail Management System 140. In addition, E-Mail Management System 140 may use the business e-mail reference code to index, record, search, retrieve and store all business e-mail correspondence with other client, project and/or business records and determines business e-mail storage and disposal. The reference code may be recorded in the reference code field of the electronic tag of the e-mail message. Block 205 represents E-Mail Management System 140 generating an electronic tag.

In a preferred embodiment, after the business e-mail message has been indexed, E-Mail Management System 140 sends the original e-mail message and generates two copies of the business e-mail message. Typically, all business e-mails are stored in read-only format in the central repository database 150 and in E-Mail Records Database 180.

FIG. 2B is a continuation of the e-mail recording process depicted in FIG. 2A. Block 206 represents E-Mail Management System 140 sending the business e-mail message. Typically, the two copies are converted into HTTP format. Block 207 represents E-Mail Management System 140 copying the e-mail message and its electronic tag. The process is similar to that of word processing programs convert word processing documents into HTTP format by automatically attaching HTML tags to the document, as is known in the art.

FIG. 2C is a continuation of FIG. 2B. Block 208 illustrates E-Mail Management System 140 distributing the e-mail message to Databases 150 and 180. Block 209 represents E-Mail Management System 140 sending the e-mail to the recipient of the e-mail. Block 210 represents E-Mail Management System 140 converting the e-mail message to HTTP format. Block 211 represents the system storing the e-mail message in Central Repository Database 150. Block 212 represents E-Mail Management System 140 storing the e-mail message in E-Mail Records Database 180.

Personal E-Mail Codes

Figure 11:
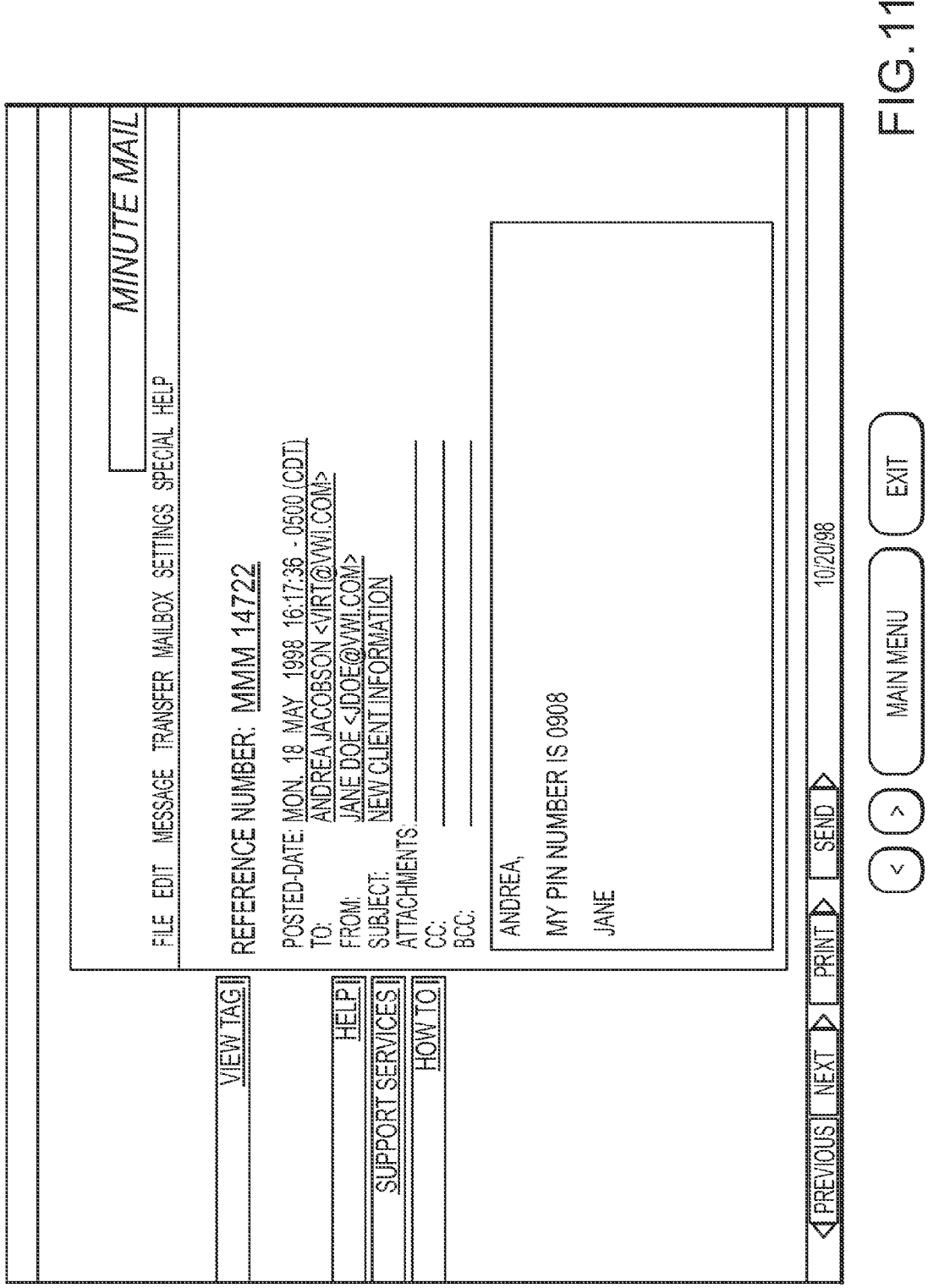
FIG. 11 represents an exemplary screen display illustrating a minute mail screen.

Personal e-mail codes allow an organization to enforce a policy regarding personal e-mail use. E-Mail Management System 140 may give the organization the opportunity to monitor e-mail policy compliance by setting maximum e-mail message usage levels for personal e-mails. FIG. 11 illustrates an example of a business e-mail contemplated in accordance with the Present Invention.

Figure 10:
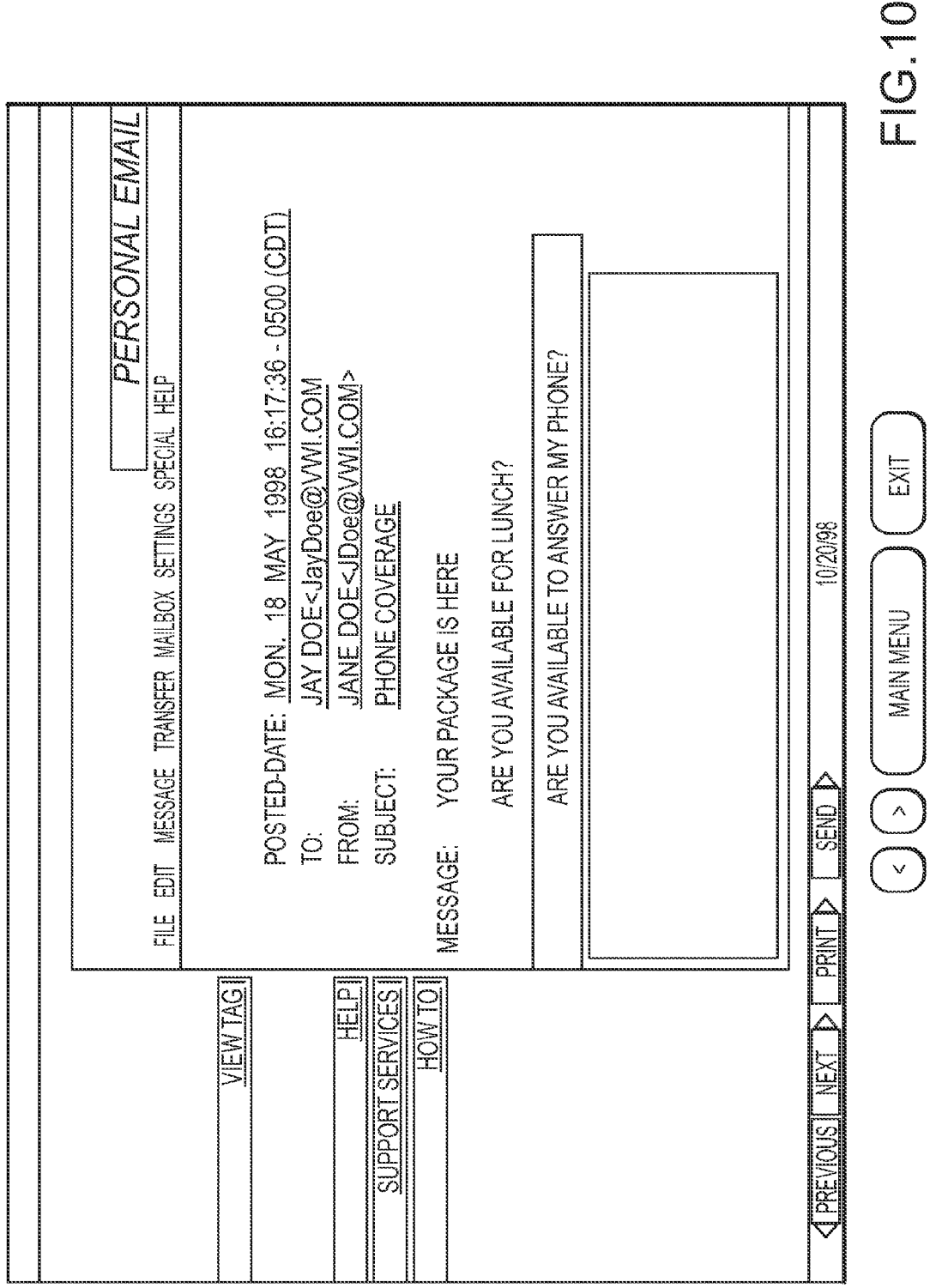
FIG. 10 represents an exemplary screen display illustrating a personal e-mail screen.

A network user may be assigned a personal e-mail code number. FIG. 10 is an exemplary screen display illustrating a personal e-mail screen. Personal e-mail codes may end in a text, e.g., PEM, that indicates a personal e-mail message and includes the network user's employee identification number. For example, a network user's employee identification number may be 14772, and the user's personal e-mail code number may be PEM14772.

A network user may send a personal e-mail message from a personal e-mail Intranet site. The network user may enter his personal e-mail number into the reference code field of the electronic tag of an e-mail message. E-Mail Management System 140 may be configured to read the personal e-mail code and compare the personal e-mail code to the maximum number of personal e-mail messages assigned to the network user to monitor the number of daily personal e-mail messages a network user sends per day. The maximum number may be listed in the network user's user profile.

When composing a personal e-mail message, the user may be required to enter his personal e-mail code into the reference field of the personal e-mail message. After the user has composed the e-mail and has indicated that he wants to send the e-mail message. The system typically reads the maximum personal e-mail number from the network user's user profile and reads the personal e-mail field for e-mail messages sent for the day. If the network user is within his personal e-mail range, the e-mail message will be sent to the recipient. If the numbers of e-mail messages are greater than the amount of maximum e-mail messages that a user is allowed to send, the system will retain the e-mail message in a queue. Those skilled in the art will recognize that this "holding" process may implemented when a faulty network connection prevents delivery of an e-mail message. E-mail messages may be retained in a queue until the network connection can be reestablished. The system could send the e-mail message when the user logs into the system on the following day. Alternatively, violation of the limits may result in actions other than placing the e-mail message in a queue, such as sending the network user or network administrator a warning message. The message may also be processed regularly, but the network e-mail policy violation may be indicated in a log file.

The personal e-mail code may also signal E-Mail Management System 140 to attach a disclaimer to the bottom of the each e-mail message with a PEM as the e-mail code in the reference code field. For example, a disclaimer may include a message to the receiver that the e-mail message they have received is the opinion of the user and not that of the employer, thereby limiting the organization's liability. If the network user exceeds the maximum personal message limit, E-Mail Management System 140 signals the policy compliance monitor 110 to provide network user compliance monitoring with network security policy stored in a database, to electronically evaluate network security policy compliance based on network user compliance, and undertake a network policy compliance action in response to network security policy compliance.

Minute Mail

The minute mail function of E-Mail Management System 140 allows senders and receivers of e-mail messages to purge e-mails from E-Mail Management System 140 without any record of the message being retained by the sender, receiver or the log file of E-Mail Management System 140. FIG. 11 is an exemplary screen display illustrating a minute mail screen. E-Mail Management System 140 is flexible in that it can perform various user definable minute message options including sender purge and recipient purge. Typically, E-Mail Management System 140 may also provide several message notification options that are similar to Caller-ID options currently sold by phone companies. A network user may choose minute mail options from a menu of e-mail messaging options within E-Mail Management System 140.

Examples of message notification options include block minute mail, sender's request to send minute mail, view sender's address prior to opening and/or accepting a message, autoreply to decline purge minute mail, autoreply indicating network user accepts minute mail and declines purge, autoreply indicating network user accepts and saves all minute mail, minute mail waiting, and purge minute mail request denied.

Each e-mail message typically has an electronic tag. E-Mail Management System 140 may record the sender and recipient's message activities in the e-mail's electronic tag. For example, the system may send notification messages to the sender regarding the recipient's treatment of an e-mail message. Several sender reply options may include block minute mail, purge unopened minute mail, purge minute mail received, notify recipient minute mail request, notify sender decline minute mail acceptance, purge minute mail sent confirmation, purged minute mail destroyed confirmation notice, and purge e-mail and electronic tag. Several purge options that may include purge e-mail content only, purge e-mail only, purge file attachment only, purge e-mail and retain file attachment, and purge e-mail and electronic tag. The network user may define his minute mail preferences in the e-mail application by indicating his minute mail preferences. This is similar to current e-mail applications in which the network user may indicate how he wants to be notified of any incoming e-mail message. System administrators may also define minute mail preferences for the organization. Once again, this is typically a user-definable feature.

Figure 12:
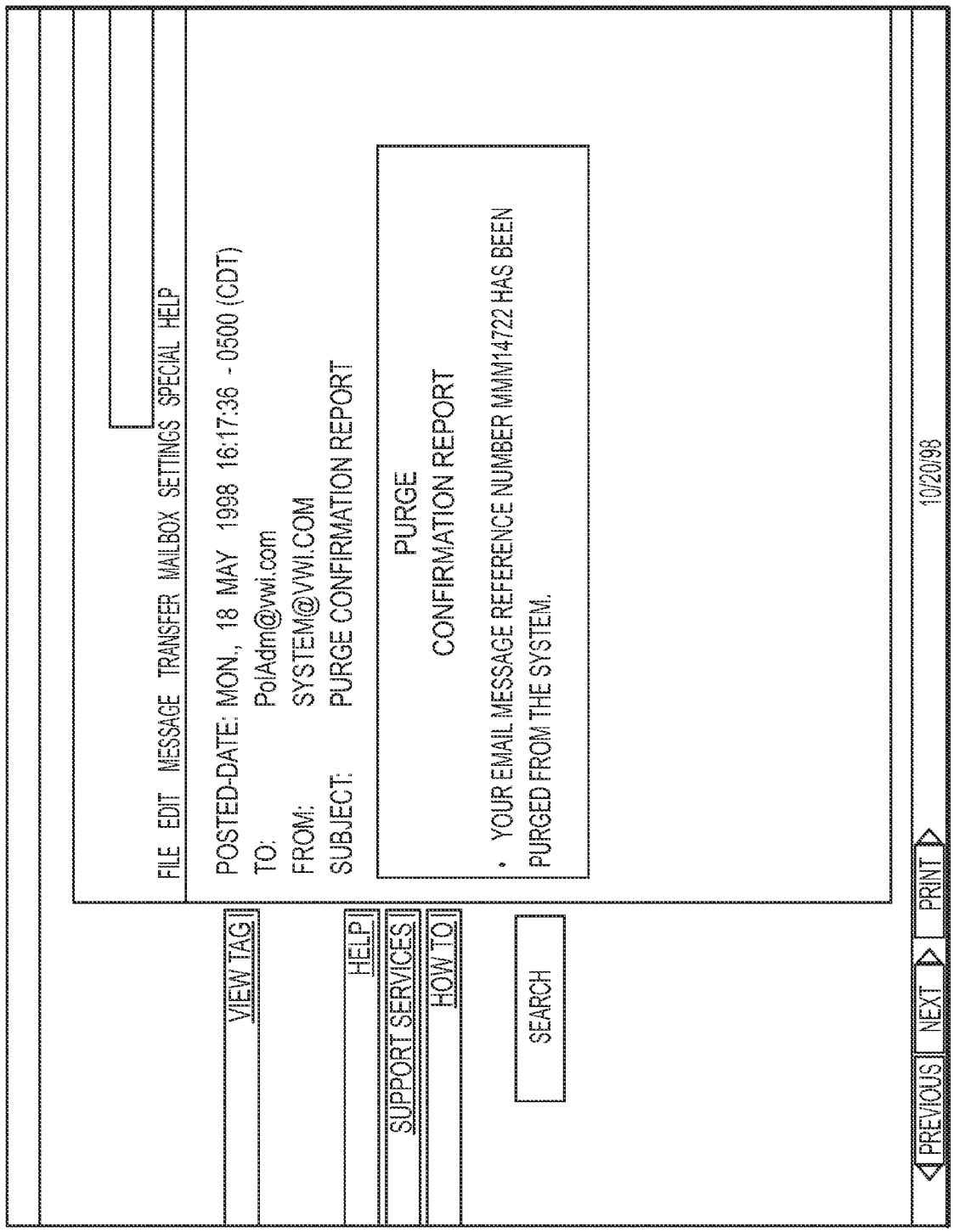
FIG. 12 represents an exemplary screen display illustrating a purge confirmation report screen.

E-Mail Management System 140 may read the purge rights field of the user profile to determine the purge rights and/or options of the network user. A purge code listed in the purge rights field may be stored in E-Mail Records Database 180. The purge code values may coordinate with the purge rights and purge options granted to the user in the system. The network user's purge rights may be recorded in the network users user's profile. FIG. 12 is an exemplary screen display illustrating purge confirmation report.

The sender and the recipients of a message may have the option of overriding a minute mail purge request. For example, a network user may send a minute mail to be automatically purged by the system. The recipient of this message may choose to save the minute message instead of allowing the system to continue executing the sender's choice of purging the minute mail message. This is typically another user-definable feature. An organization using the present system may select who has access to the purge options in accordance with their network policies. The system administrator may determine who has purge minute mail rights. Network users may be assigned a purge code. The codes may be stored in a network user's user profile. For example, an officer of an organization may have more purge rights and/or options than temporary employees in an organization.

With the minute message option, an e-mail message may remain on the screen for a limited period of time after the user has opened the e-mail message. The network user or the system administrator may determine the period of time a message is displayed. In the present system, the network users typically have the option to accept, decline, block, purge, print, copy or retain the message.

FIGS. 6 and 6B-D are flow diagrams illustrating the steps typically performed by E-Mail Management System 140 in executing a minute mail message. Block 600 represents E-Mail Management System 140 receiving a request from a network user for an e-mail form. The network user may choose the type of e-mail message he or she chooses to send. The network user may also fill in the fields of the electronic tag. For example, an organization may determine that the letters MMM and the employee's identification number are to be used as the e-mail reference code for minute mail and the network user's employee identification number may be 100. The code MMM100 may be entered into the e-mail reference code field. Block 601 represents E-Mail Management System 140 presenting an e-mail form to the network user. The network user creates the e-mail message and indicates that the message is to be sent. Block 602 representing E-Mail Management System 140 receiving the e-mail form. When the network user sends the e-mail message, the system may read the e-mail's electronic tag to begin executing the scripting code within E-Mail Management System 140. Block 603 represents E-Mail Management System 140 reading the electronic tag. Each scripting code correlates to an e-mail reference code. Block 604 represents that E-Mail Management System 140 reading the reference code. The scripting code activates an object.

E-Mail Management System 140 may read the e-mail's electronic tag, the network user's user profile and the network user's workstation specifications including, but not limited to, the workstation hardware configuration, hardware descriptions, BIOS info, software configuration and network information. Block 605 represents E-Mail Management System 140 reading the numeric value of the reference code. Block 606 represents E-Mail Management System 140 reading the user's profile. Block 607 represents E-Mail Management System 140 reading the network user's workstation.

E-Mail Management System 140 may read the reference code MMM and determine that the e-mail is a minute mail.

Block 608 represents E-Mail Management System 140 reading the text values of the reference code. The reference code, e.g., MMM, may trigger an object to carry out specific actions.

Block 609 represents the system analyzing the text code to an object. E-Mail Management System 140 may send the e-mail message to the recipient. Block 610 represents E-Mail Management System 140 matching a text code to an object.

Block 611 represents E-Mail Management System 140 reading the object's script.

Block 612 represents E-Mail Management System 140 sending the e-mail message. The object may apply font and color changes to the e-mail.

Figure 6:
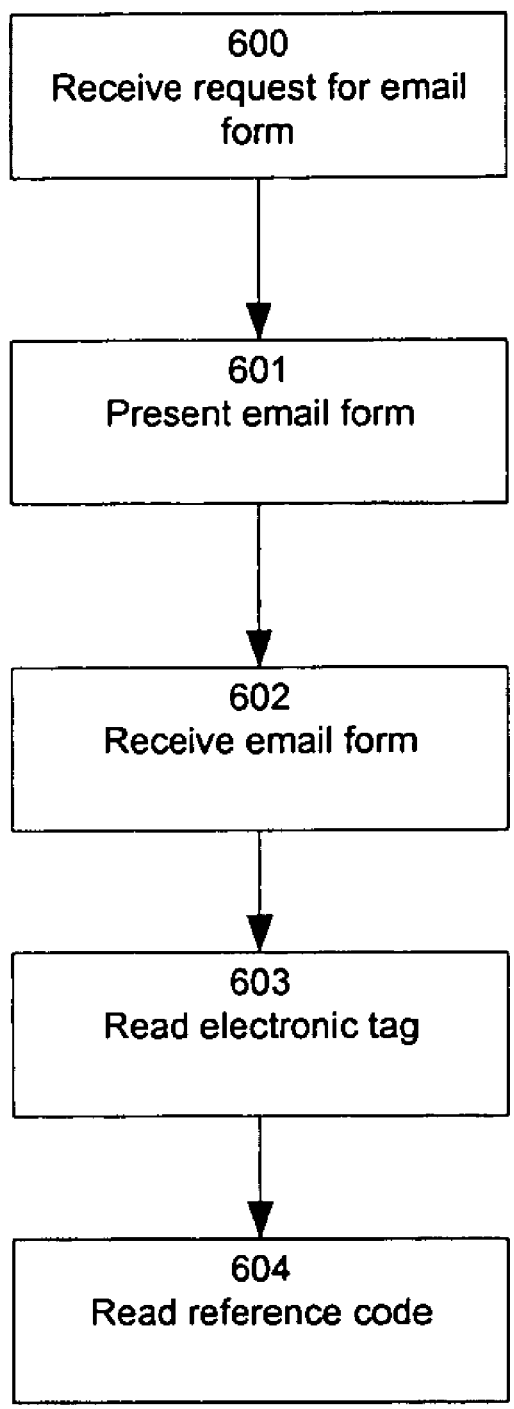
FIGS. 6 and 6B-D represents flow diagrams illustrating the steps typically performed by the E-Mail Management System in executing a minute mail message.
Figure 6B:
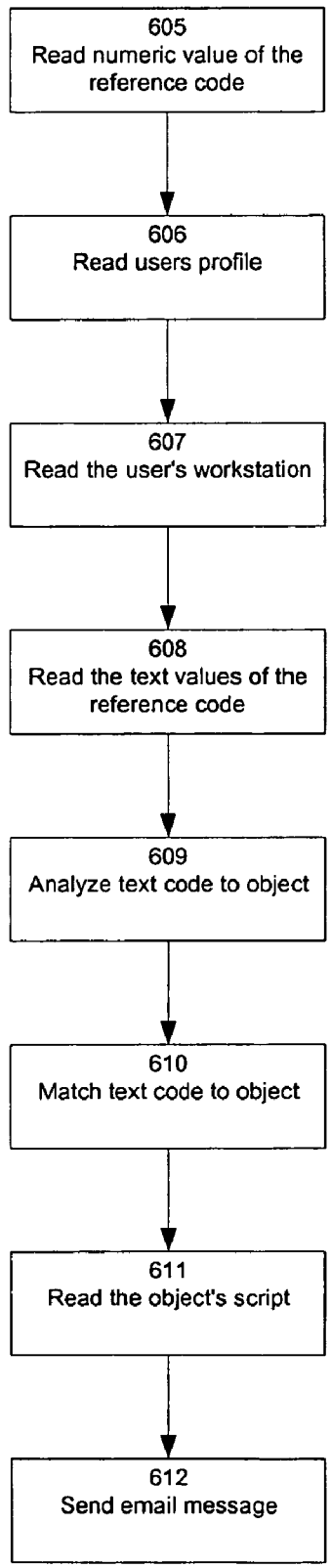
Figure 6C:
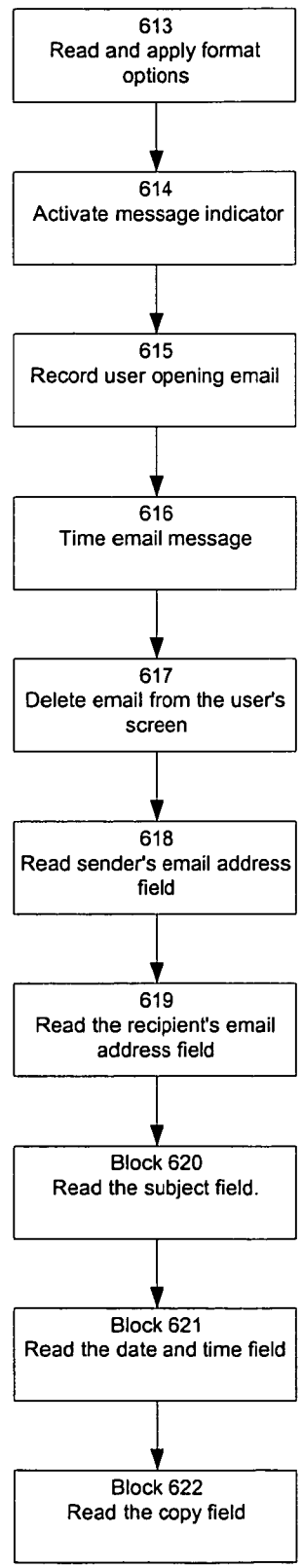

FIG. 6C is a continuation of the flow diagram of FIG. 6B. Block 613 represents E-Mail Management System 140 reading and applying the format options. E-Mail Management System 140 supports HTTP format, therefore several e-mail message format options may include a variety of font style, font colors and e-mail message designs.

Block 614 represents E-Mail Management System 140 selectively activating a message indicator. After the recipient has opened and received the e-mail message, the system 140 may allow the network user to view the e-mail message for a limited period of time.

Block 615 represents E-Mail Management System 140 recording the user's opening the e-mail messages electronic tag. After a specified period of time has elapsed, the message may disappear from the screen and E-Mail Management System 140 may begin to purge the e-mail message from the network user's e-mail application, the sender's e-mail application and the e-mail log file.

Block 616 represents the system timing the e-mail message. E-Mail Management System 140 may read the sender's e-mail address field, recipient's e-mail address field, subject field, time and date field, and copy fields of an e-mail's electronic tag.

Block 617 represents E-Mail Management System 140 deleting e-mail from the user's screen.

Block 619 represents E-Mail Management System 140 reading the sender's e-mail address field.

Block 618 represents E-Mail Management System 140 reading the recipient's e-mail address field.

Block 620 represents E-Mail Management System 140 reading the subject field.

Block 621 represents E-Mail Management System 140 reading the date and time field.

Block 622 represents E-Mail Management System 140 reading the copy field.

Figure 6D:
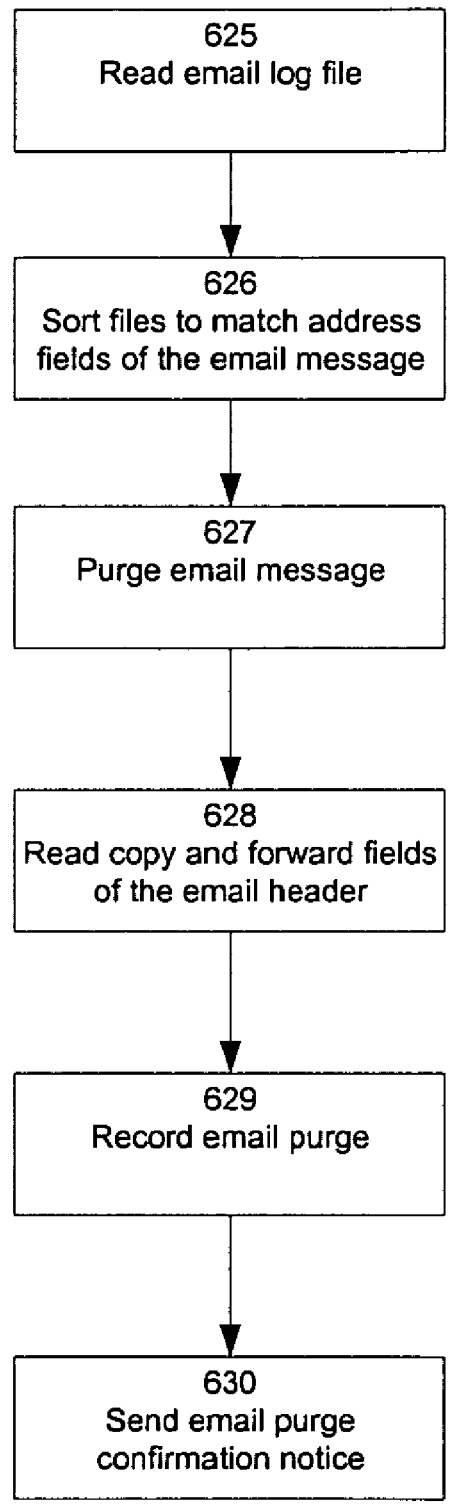

FIG. 6D is a continuation of the flow diagram of FIG. 6C.

Block 625 represents E-Mail Management System 140 reading an e-mail log file. E-Mail Management System 140 may use a sorting algorithm, as is known in the art, to search for the e-mail header fields to match the sender's e-mail address field, recipient's e-mail address field, subject field, time and date field, and copy fields of an e-mail's electronic tag.

Block 626 represents E-Mail Management System 140 sorting log files to match address fields of the e-mail message. A typical e-mail address fields may include to, from, subject, cc:, and bcc:. Once the exact e-mail entry is found, E-Mail Management System 140 may purge the e-mail message by deleting the entry from the system.

Block 627 represents E-Mail Management System 140 purging the e-mail message.

E-Mail Management System 140 typically provides user-definable features that allow users to interrupt the purging process. E-Mail Management System 140 may be configured to present the network user with an icon or message box that permits the network user to selectively interrupt the message purging process. The system may also be configured to not allow interruption, whereby once E-Mail Management System 140 enters the log file deleting routine the network user may not be able to interrupt the purge process.

E-mail systems known in the art record in the e-mail server logs the sender and the recipient of the e-mail message. Generally, the message content is not recorded. In the preferred embodiment of the present system, E-Mail Management System 140 has tape, or other storage media, backup policies, and procedures that differ from the traditional computer network backup and storage policies and procedures. Those skilled in the art will recognize that any hardware/software configuration is possible that allows E-Mail Management System 140 to control the backup and storage procedure, thus allowing the effective purging of e-mails in E-Mail Management System 140. Generally, longer backup cycles for a network are preferred by system administrators since it may ensure an organization's ability to recover from computer or network failures or disturbances. For an e-mail system, generally, shorter backup cycles are preferred to ensure no unwanted copies of e-mail messages reside in the system or on back up media.

In E-Mail Management System 140, no backup of E-Mail Management System 140 may be the optimal backup procedure to ensure that no unwanted copies of e-mail messages reside in the system or on back up media. Backup procedures may be necessary for all of the e-mail databases within E-Mail Management System 140. This may, include, but is not limited to, E-Mail Records Database 180 and Electronic Contracts Database 190.

E-Mail Management System 140 may be configured so that copies of e-mail that may have been listed in the copy fields of the e-mail header or messages forwarded to other recipients are searched by the system. Block 628 represents E-Mail Management System 140 reading the copy and forward fields of the e-mail header. E-Mail Management System 140 may use a sorting algorithm, as is known in the art, to search for the e-mail header fields to match the sender's e-mail address field, recipient's e-mail address field, subject field, time and date field, and copy fields of an e-mail's electronic tag. Once the exact e-mail entry is found, the object that is correlated to the purge code in an e-mail's electronic tag may purge the e-mail message from E-Mail Management System 140 by deleting the entry from E-Mail Management System 140.

Block 629 represents E-Mail Management System 140 recording the e-mail purge. E-Mail Management System 140 may send a purge confirmation message to the sender and the recipient to indicate the purging process is completed. Block 630 represents E-Mail Management System 140 sending an e-mail purge confirmation notice.

E-Mail Management System 140 typically has several user-defined purged message recording options. For example, the network user may define if E-Mail Management System 140 is to retain the electronic tag from a purged message in the e-mail management database. Alternatively, E-Mail Management System 140 may read the purge rights value of the user profile to determine the purge rights and/or options of the network user as defined by the policies of the organization or a system administrator.

E-Mail Management System 140 may be configured so that the system administrator may determine who has purge message recording rights. Network users may be assigned a purge code. A purge code is typically configured in E-Mail Management System 140 to tell the system how to process an e-mail. If a network user has a purge code in their user profile, the system may permit the network user to purge any e-mail messages he chooses. Alternatively, the purge code may allow a user to purge only the content of an e-mail (retaining the electronic tag) or both the e-mail and the electronic tag. The purge codes may be stored in a network user's user profile, and it may tell the system that the network user has the right to purge e-mail messages. For example, a chief executive officer (CEO) may have more purge rights and/or options than other employees. The purge value code listed in the purge rights field may be stored in E-Mail Records Database 180. The purge code values may coordinate with the purge rights and purge options granted to the user and stored in the network user's user profile in the system.

After an e-mail message has been disposed, E-Mail Management System 140 may record the disposal in the message disposal status field of an e-mail's electronic tag.

An Internal, Intranet-Based Mailing System

Figure 13:
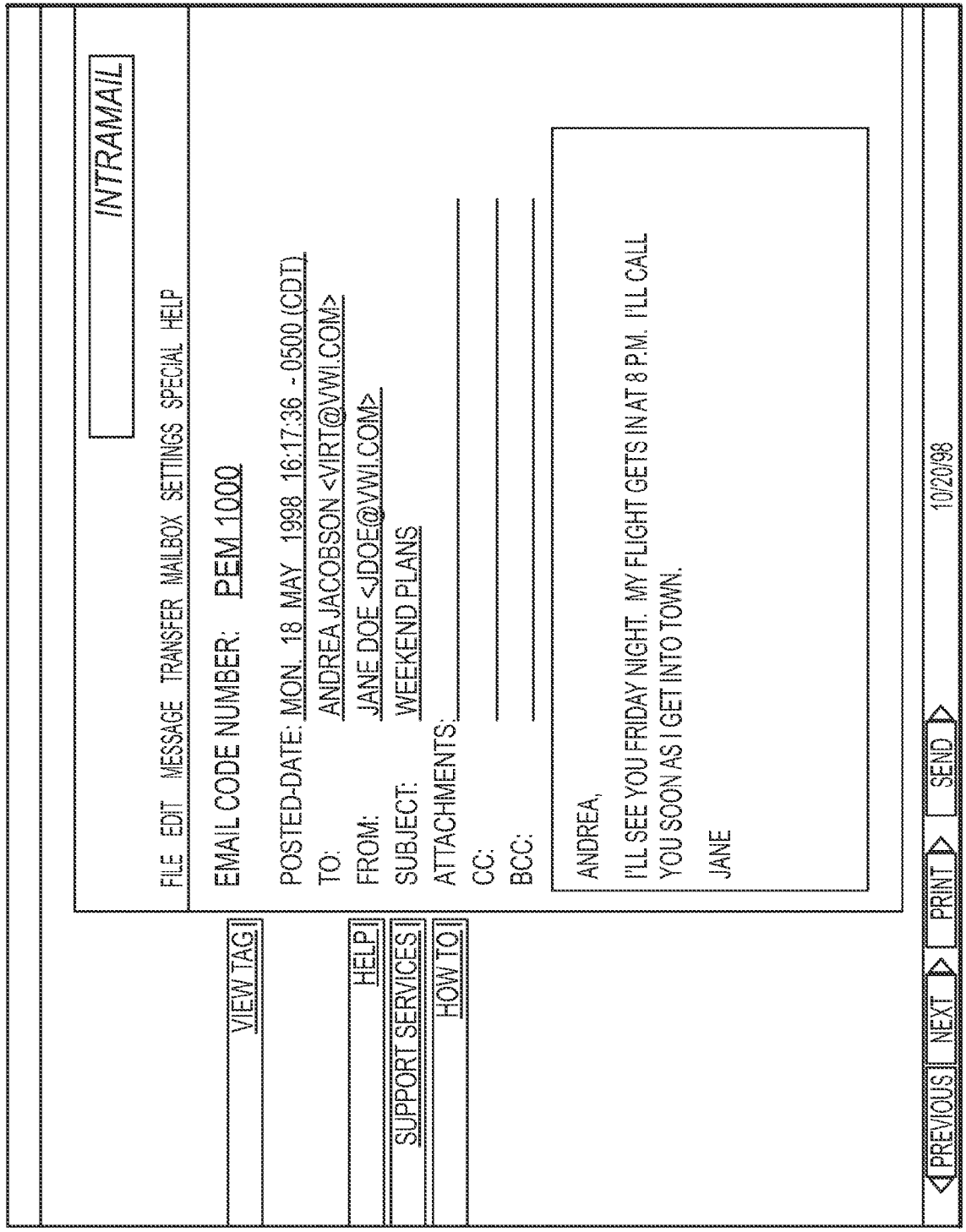
FIG. 13 represents an exemplary screen display illustrating an intranet-based e-mail screen.

An internal, intranet-based mailing Intranet site may provide fast inter-office messaging. E-mail may be used for more formalized correspondence and record keeping. FIG. 13 is a screen display illustrating an intranet-base e-mail screen. Internal messages can be sent to individuals and small groups. The internal messages can be customized and may be limited in length, for example, to 200 characters per message. E-Mail Management System 140 may be configured so that internal messages do not have a tracking or reference number and may be purged daily or weekly from the system. Such internal messages could include prefabricated messages. Since internal messages may not have a tracking or reference number in such a system, the messages may not be tracked or indexed by the system. QuickNotes™ is an existing Intranet-based e-mail system that provides inter-office messaging.

Bulletin Board E-Mail Postings

Figure 14:
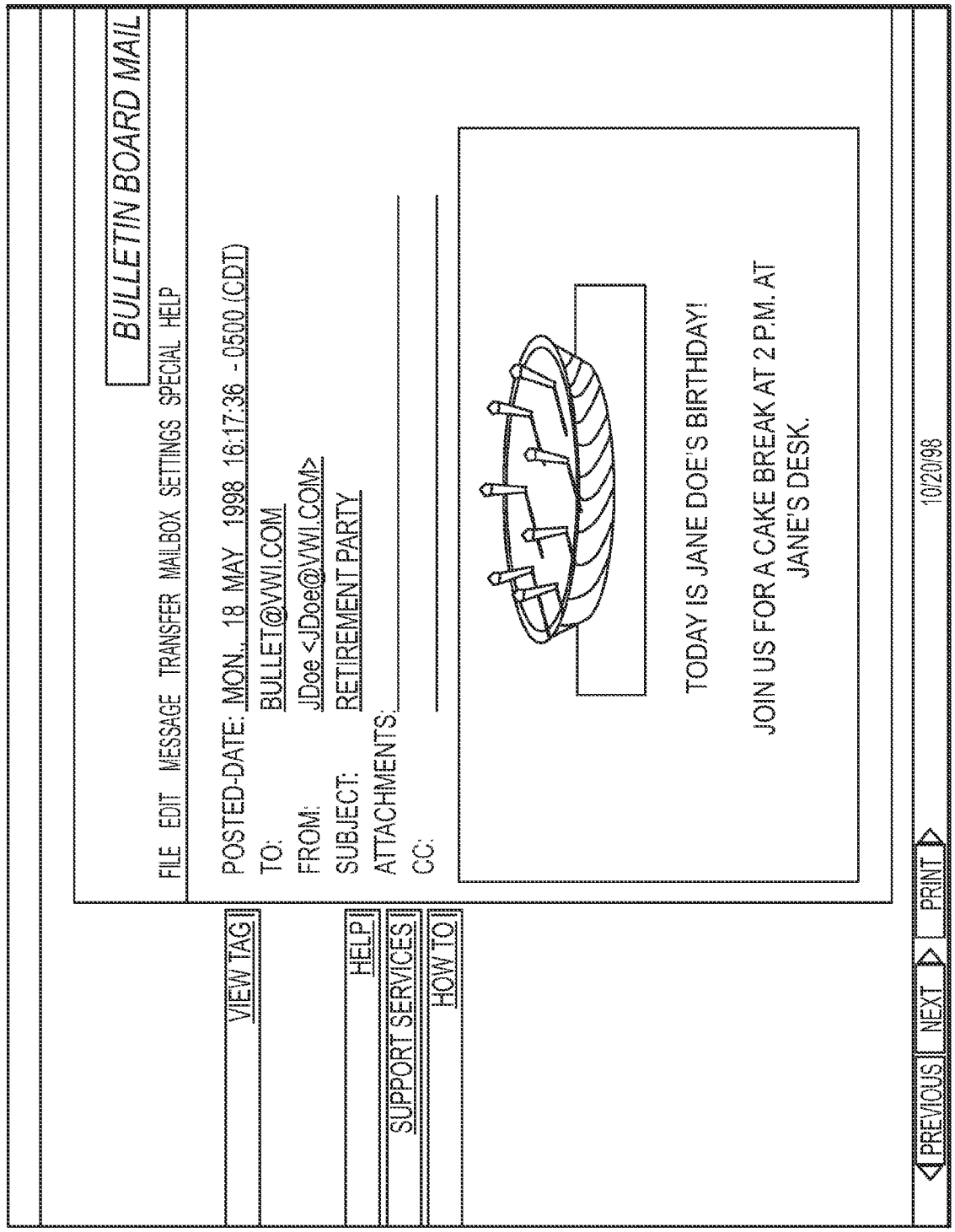
FIG. 14 represents an exemplary screen display illustrating a bulletin board e-mail screen.
Figure 17:
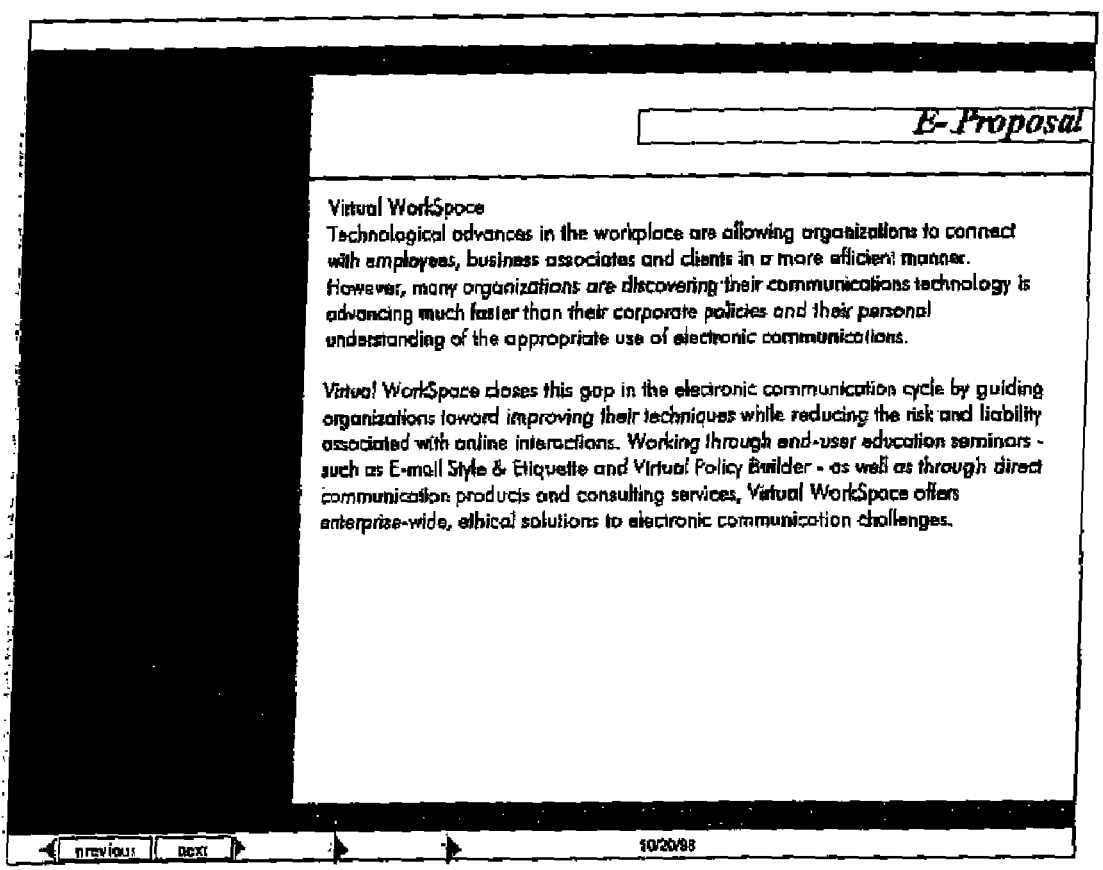
FIG. 17 represents an exemplary screen display illustrating another e-mail proposal screen.
Figure 18:
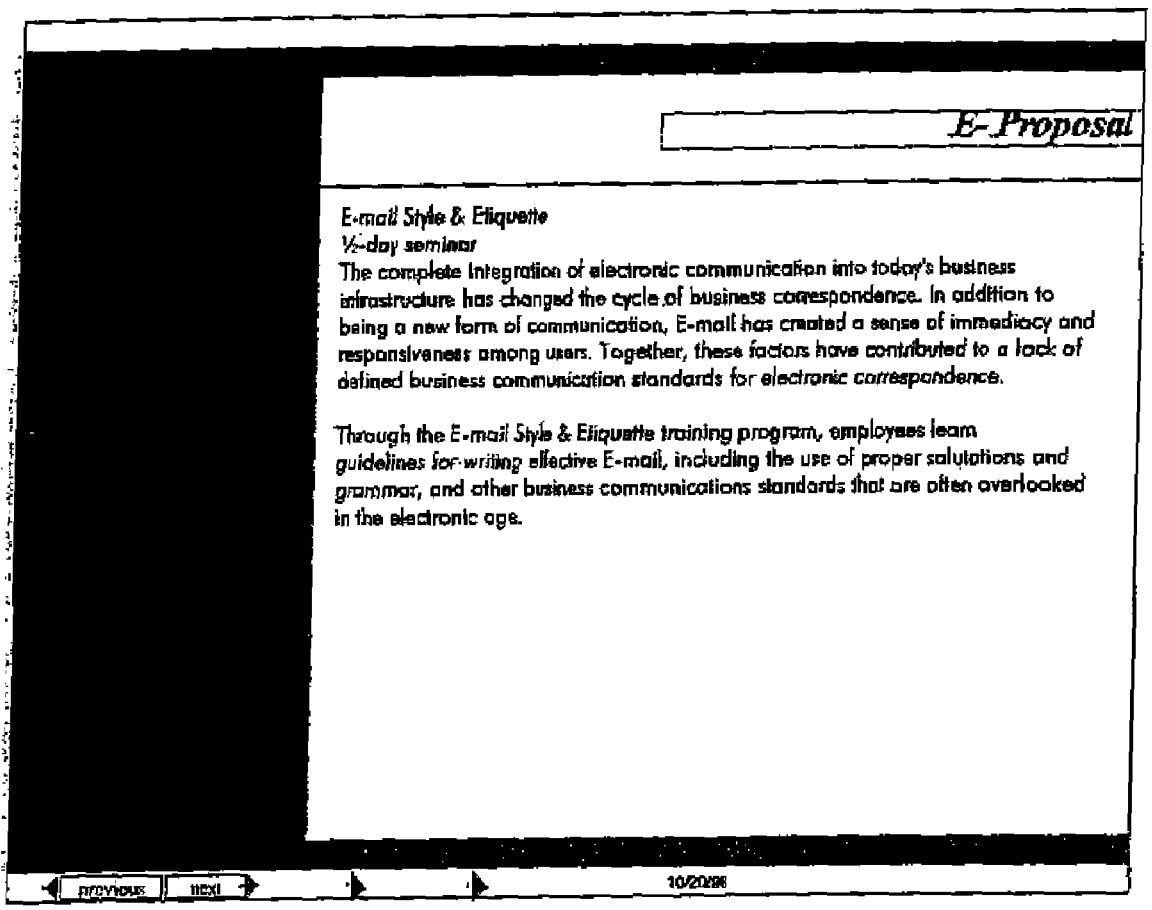
FIG. 18 represents an exemplary screen display illustrating another e-mail proposal screen.
Figure 19:
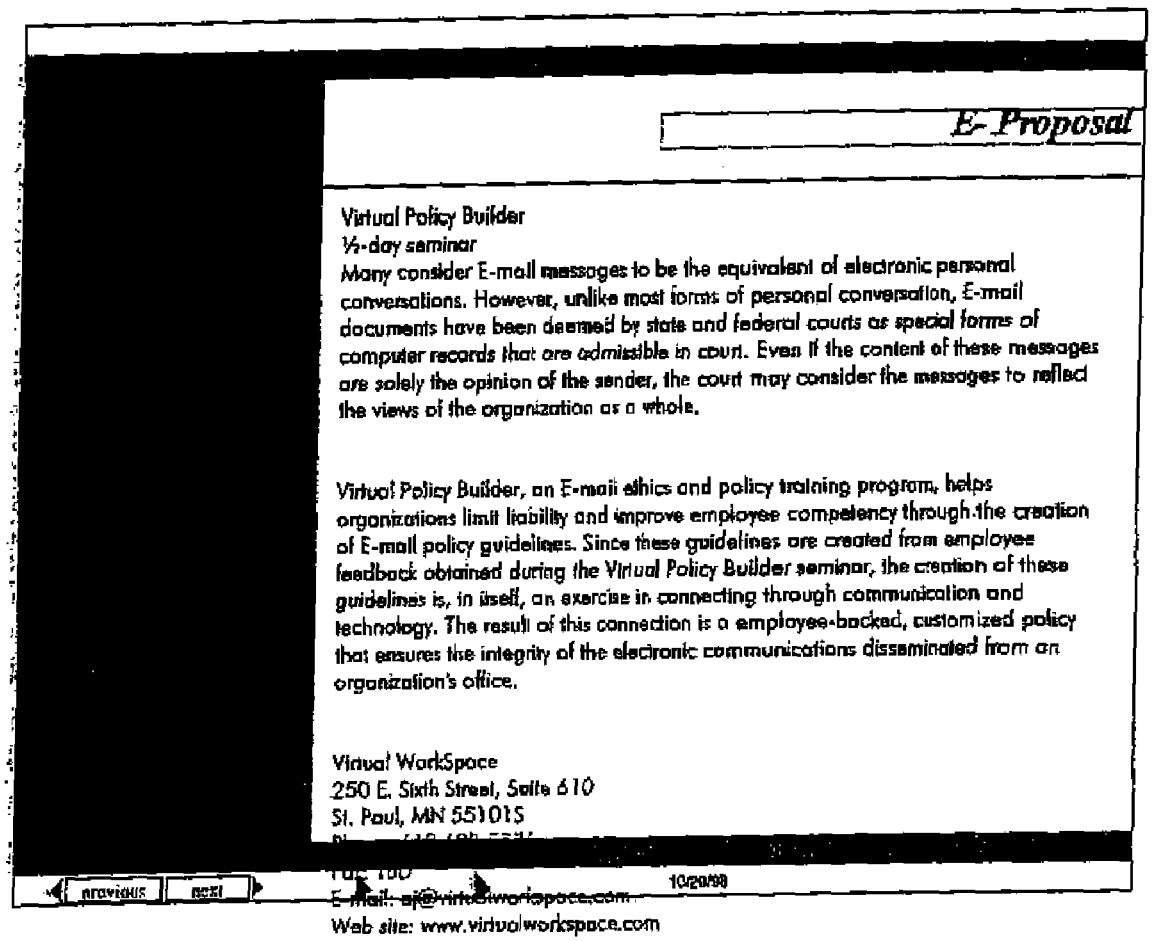
FIG. 19 represents an exemplary screen display illustrating another e-mail proposal screen.
Figure 20:
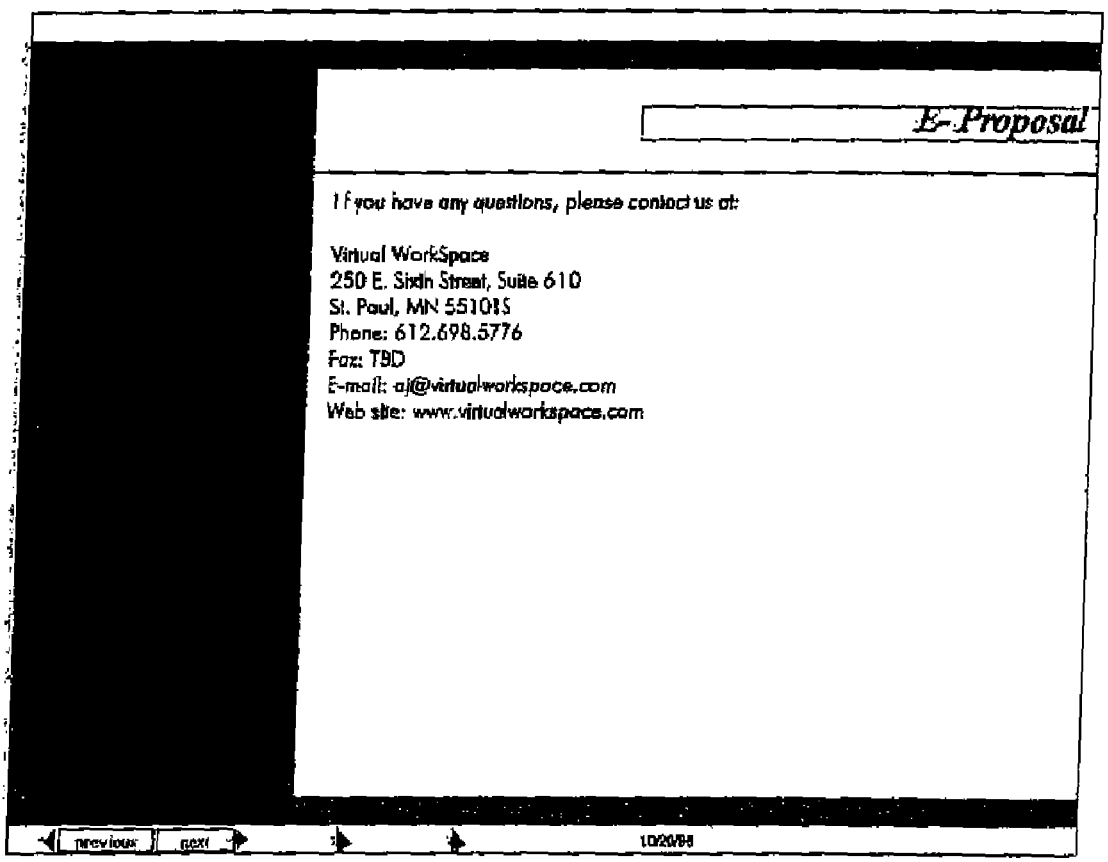
FIG. 20 represents an exemplary screen display illustrating another e-mail proposal screen.

A bulletin board, Intranet mailing system may provide opportunities for employees to post messages and other internal notices. FIG. 14 is a screen display illustrating a bulletin board e-mail screen according to an embodiment of the invention. If messages are posted to a bulletin board, e-mail may be used for more formalized correspondence and record keeping. FIG. 14 illustrates an example of a business e-mail contemplated in accordance with the Present Invention.

File Encryption Tracking, and Monitoring

File encryption tracking and monitoring may protect data confidentiality and reduce its accessibility. E-Mail Management System 140 may also be configured so that it uses file encryption tracking and monitoring to help reduce the risk of data loss by accidental or intentional modification, the disclosure of or destruction of confidential or proprietary information, or through the unauthorized use of information for commercial gain or malicious purposes. The file encryption tracking and monitoring activity may be reported to the policy compliance monitors 110 for compliance reporting and tracking. Known products configured to accomplish these tasks include the InvisiMail™ system available from RPK.

Writing Standards and E-Mail Content Policy Compliance

The system may be configured to include a writing standards policy compliance function in order to enact a more careful review of e-mail messages sent outside of the organization and prevents problematic e-mail from ever being created. Known products that are configured to accomplish this functionality include Privacy Alert software available from Aladdin Web Solutions.

User Identity Module

To be in policy compliance, users typically must adhere to the addressing and naming conventions as defined by their organization. A user identity module in the present system may be configured to ensure that a network user is not allowed to send e-mail messages using an alias or a false identity. Generally, a network user is assigned one e-mail address, and if the network user attempts to send an e-mail message under a false e-mail address or name, the system will not allow the e-mail message to be sent. The Novell Groupwise system available from Novell is an e-mail product that restricts network users from sending an e-mail message by using an alias or false e-mail address.

E-Mail Storage Monitoring

E-Mail Management System 140 may be configured to monitor e-mail storage space and to make the storage space size user-defined. For example, a CEO may be permitted greater e-mail storage space and bandwidth than other employees. E-Mail Management System 140 may also be configured to read the job level fields of the user profile to determine the amount of e-mail storage space and bandwidth to allocate to the network user. The job levels listed in the job level field may be stored in E-Mail Records Database 180. The job level values typically coordinate the amount of storage space E-Mail Management System 140 may allocate for e-mail storage.

For example, a CEO may have a job level A and an administrative assistant may have a job level W. When the CEO logs into E-Mail Management System 140, E-Mail Management System 140 may read the job level field from the CEO's user profile. Next, E-Mail Management System 140 may refer to the e-mail storage database 1000 to match the value listed in the job level field to the e-mail storage allocation field. In this example, job level A may be allocated 500 kilobytes of memory. E-Mail Management System 140 allocates the appropriate e-mail storage space for the CEO. Likewise, when the administrative assistant with job level W logs into E-Mail Management System 140, E-Mail Management System 140 may read the job level field from the administrative assistant's user profile. Next, E-Mail Management System 140 may refer to the e-mail storage database 1000 to match the job level field to the e-mail storage allocation field. In this example, job level W may be allocated 100 kilobytes of memory.

Passwords

E-Mail Management System 140 has time and date fields to send e-mail to users who have not changed their passwords for a set period of time. E-Mail Management System 140 may be configured to require network users to choose better, hard-to-break passwords. E-Mail Management System 140 preferably tracks a network user's log-in/passwords/hardware token information and monitors password access to E-Mail Management System 140.

Message Status

E-Mail Management System 140 may alert the network user to the status and arrival of an e-mail message. When a network user receives an e-mail message, E-Mail Management System 140 may read an e-mail's reference codes to determine how to process the e-mail message. Each e-mail reference code typically matches an object stored in the e-mail management database. Each object may have a script (i.e., scripting language) that instructs the object how to process the e-mail message. The scripting language of an object may contain instructions related to the distribution, routing, font styles, access, viewing, purging and message status of an e-mail message as indicated by the e-mail's reference code.

Each e-mail reference code may trigger an icon in E-Mail Management System 140. The icon may alert the user when an e-mail message has been received. All message icons and status features typically are user-definable functions. An e-mail message's font style and color may differ from other e-mail message types. An application the network user is running may blink or flash to alert the user of an incoming e-mail message. For example, a minute message may have a bright blue font, and a distinctive chime may be assigned to the minute message. Another function may include utilizing the clock menu bar, as in Microsoft Windows applications. The clock menu bar may pulse, flash or change color to indicate to the network user a received a minute message. Distinctive chimes or announcement options may be activated to alert the receiver that an e-mail message has arrived. The ring options include ring, ring and vibrate, flash, beep once, silent and vibrate. Various announcement options may be including a male voice, female voice, child's voice or other sounds.

Message Viewing

E-Mail Management System 140 may be configured so that a network user may define who can access and view an e-mail message by choosing options from the message viewing field in an e-mail's electronic tag. In such a system, network users may chose an option to block the viewing and access to the text of an e-mail message. Known software with text blocking features includes Page Vault software available from Authentica Security Technologies, Inc. Typically, E-Mail Management System 140 is configured so that the text blocked e-mail may be saved, printed, forwarded, copied and/or may be sent as a minute mail, and so that all revisions, copies and purges of an e-mail may be recorded by an e-mail's electronic tag.

Another typical e-mail viewing option may prevent an e-mail from being viewed outside of the organization. The system may use an e-mail reference code that reads the network user's workstation specifications. Prior to sending a new or previously stored e-mail message, the system may read the network user's workstation specifications, including, but not limited to, network connections, modem utilization, and/or the registry, and compare the specifications to the user's workstation specifications listed in the network user's user profile. If the workstation specifications differ from the workstation specifications listed in the user's profile, the system typically will not make the e-mail message available for viewing.

Incoming Mail

Figure 3:
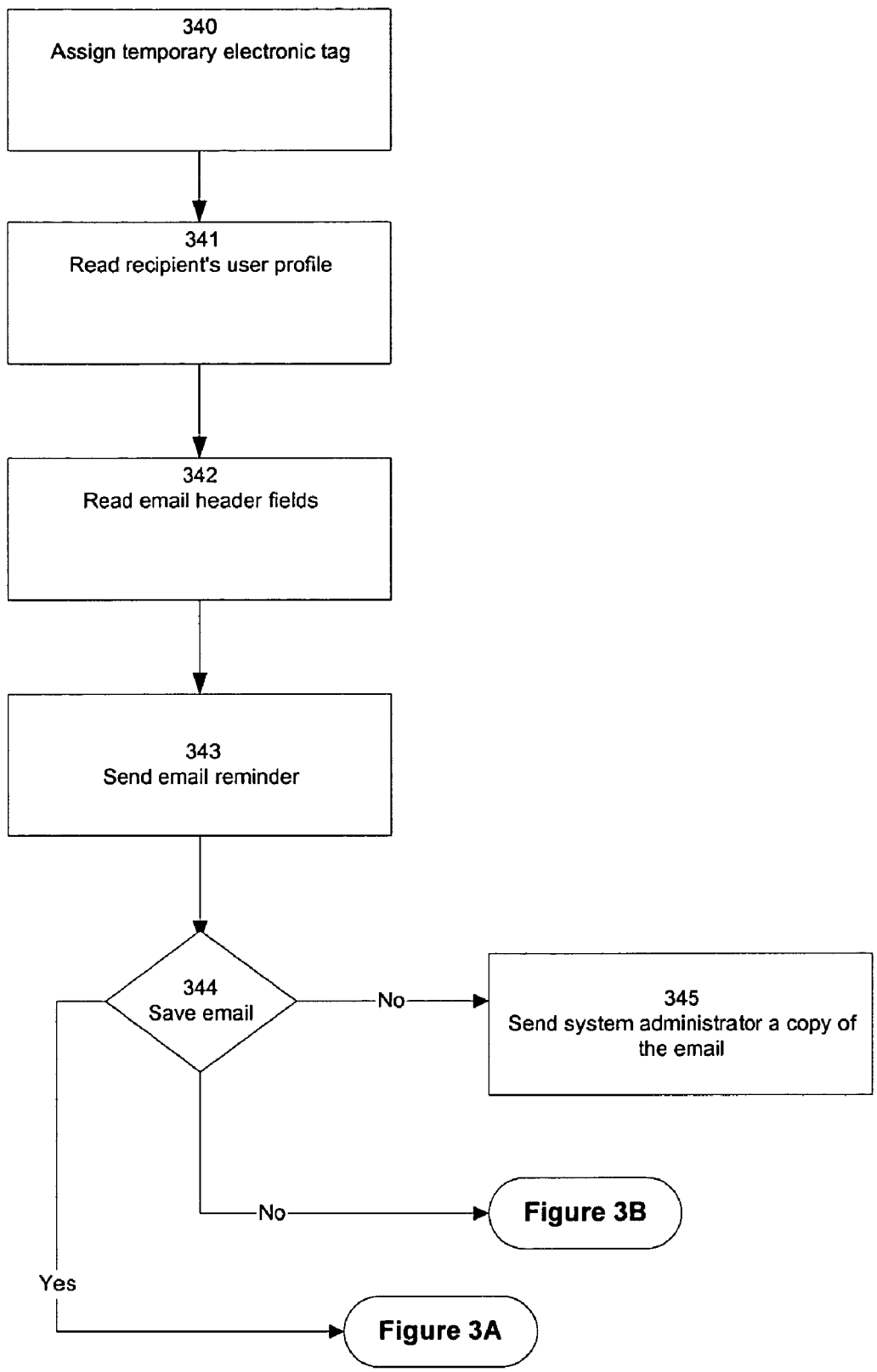
FIGS. 3-3C represent flow diagrams illustrating an E-Mail Management System processing incoming e-mail messages.
Figure 3A:
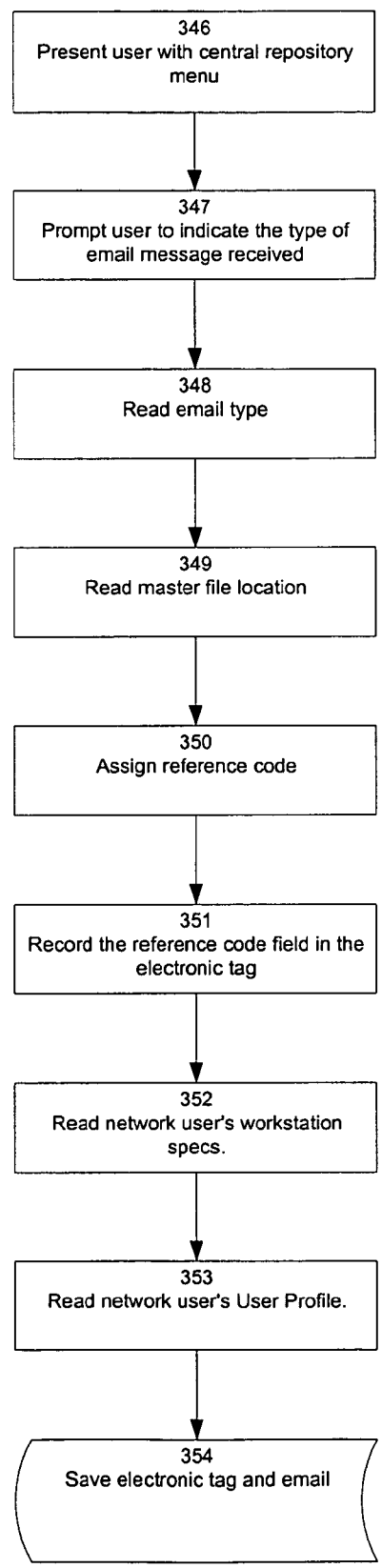
Figure 3B:
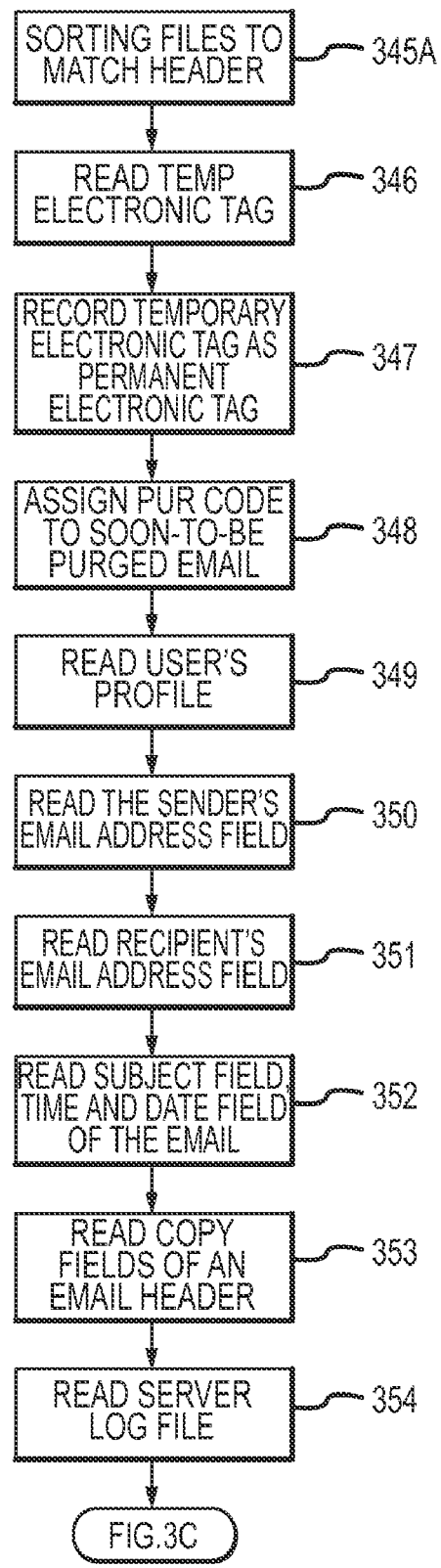
Figure 3C:
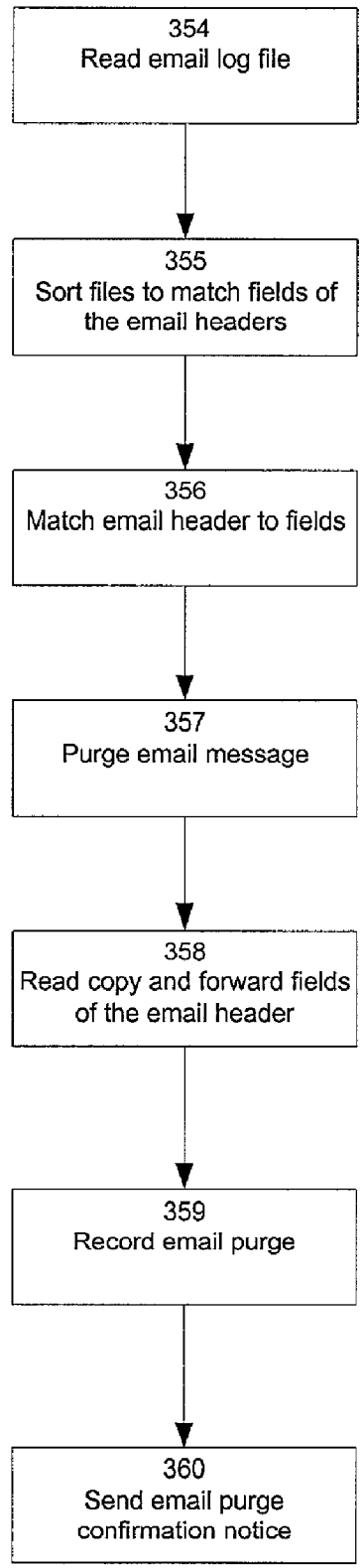

After the network user has received, opened and read an e-mail message for the first time, E-Mail Management System 140 may assign a temporary electronic tag to the e-mail message. FIGS. 3-3C are flow diagrams illustrating E-Mail Management System 140 processing an incoming e-mail message. Block 340 represents E-Mail Management System 140 assigning a temporary electronic tag. The network user may choose to file the e-mail with E-Mail Management System 140 or to purge the e-mail. Regardless of the network user's choice, E-Mail Management System 140 may require all e-mail messages to have an electronic tag. This is to ensure all incoming and outgoing e-mail is recorded, retained and properly stored in E-Mail Management System 140.

E-Mail Management System 140 may be configured to assign a temporary electronic tag to the incoming e-mail and hold it in a temporary file in the central repository database 150. The reference code for the temporary e-mail, e.g., TMP, may be comprised of the text values, and the numeric value assigned may be the recipient's employment identification number. Block 341 represents E-Mail Management System 140 reading the recipient's user profile. For example, a temporary electronic tag may have a reference number of TMP2121, with 2121 representing the employee's identification number.

In addition, E-Mail Management System 140 may read the e-mail header information to record the recipient's e-mail address, sender's e-mail address, date, time and subject fields for the electronic tag. Block 342 represents E-Mail Management System 140 reading the e-mail header fields.

The recipient of the e-mail may be reminded that he has an e-mail that is to be filed during system logins. Block 343 represents E-Mail Management System 140 sending an e-mail reminder.

Block 344 represents E-Mail Management System 140 asks the network user to determine if he chooses to save the e-mail in the central repository database 150.

If the network user ignores the reminders after a predetermined number of consecutive logins, for example, after three consecutive logins, E-Mail Management System 140 may send a copy of the e-mail to the system administrator who may file the e-mail or may take an action against the recipient. Block 345 represents E-Mail Management System 140 sending the system administrator a copy of the e-mail.

A network user normally may choose to save the e-mail message or to purge the e-mail message. FIG. 6 is a flow diagram illustrating an e-mail menu screen. The network user may fill in the fields of the electronic tag and choose to save the e-mail message. If the user indicates that he wants to save the message, E-Mail Management System 140 may present the user with a central repository database 150 menu. FIG. 3A is a continuation flow diagram of FIG. 3. Block 346 represents E-Mail Management System 140 presenting the network user with the central repository database 150 menu. The user may indicate the location and name of the file in which to store the e-mail message. After the user has chosen the location to store the e-mail message in the. central repository, the system may prompt the network user to indicate the type of e-mail message he has received. Block 347 represents E-Mail Management System 140 prompting the user to indicate the type of e-mail message he has received.

If the e-mail is a business e-mail, E-Mail Management System 140 may assign a code, e.g., BEM, to the beginning of the e-mail with the master file number to create the reference code for the e-mail. Block 348 represents E-Mail Management System 140 reading the e-mail type. If the e-mail is a personal e-mail, E-Mail Management System 140 may assign a code, e.g., PEM, to the beginning of the e-mail with the master file number to create the reference code for the e-mail. Block 349 represents E-Mail Management System 140 reading the master file location. Block 350 represents E-Mail Management System 140 assigning a reference code. The reference code is recorded in the reference code field of the electronic tag of the e-mail message. Block 351 represents E-Mail Management System 140 recording the reference code field in the electronic tag.

For example, if a user has received a business e-mail message, he may choose to index and store the business e-mail. The user may indicate the file where the e-mail message may be stored. E-Mail Management System 140 may read the master file number from the location where the network user wishes to store the business e-mail message. Next, the network user may determine the type of e-mail message the user has composed. Therefore, if a master file code is 9082, and the network user indicates that the e-mail message is a business e-mail, the electronic tag may be assigned the reference code BEM9082. This reference number may be used by the system to index and track the e-mail in E-Mail Management System 140. In addition, E-Mail Management System 140 may use the business e-mail reference code to index, record, search, retrieve and store all business e-mail correspondence with other clients, projects and/or business records and it may determine business e-mail storage and disposal. The reference code is recorded in the reference code field of the electronic tag of the e-mail message. If the network user indicates the e-mail message is a business e-mail (e.g., code BEM) or file, E-Mail Management System 140 may automatically copy the e-mail message into E-Mail Records Database 180. In addition, E-Mail Management System 140 may read the network user's workstation specifications and the network user's user profile to complete the electronic tag. Block 352 represents E-Mail Management System 140 reading the network user's workstation specifications. Block 353 represents E-Mail Management System 140 reading the network user's user profile. The electronic tag and the e-mail are saved in E-Mail Records Database 180. Block 354 represents E-Mail Management System 140 saving the electronic tag and the e-mail.

If the network user chooses to purge the incoming e-mail message, E-Mail Management System 140 may prompt the network user to file the e-mail in the central repository 150. If the network user indicates he does not want to file the e-mail message, E-Mail Management System 140 may read the information from the temporary electronic tag and record it as the permanent electronic tag for the e-mail. Block 345A represents E-Mail Management System 140 sorting files to match fields of the e-mail headers. Block 346 represents E-Mail Management System 140 reading the temporary electronic tag. Block 347 represents E-Mail Management System 140 recording temporary electronic tag as a permanent electronic tag.

The electronic code may be comprised of a text value and the recipient's employee identification number from the network user's user profile. The system may assign a text value, e.g., PUR, to the reference code for the soon-to-be-purged e-mail. Block 348 represents E-Mail Management System 140 assigning the PUR code to soon-to-be purged e-mail.

Block 349 represents E-Mail Management System 140 reading the user's profile. E-Mail Management System 140 may begin to purge the e-mail message from the network user's e-mail application, the sender's e-mail application and the e-mail log file.

E-Mail Management System 140 may read the sender's e-mail address field, recipient's e-mail address field, subject field, time and date field, and copy fields of an e-mail's electronic tag. Block 350 represents E-Mail Management System 140 reading the sender's e-mail address field.

Block 351 represents E-Mail Management System reading the recipient's e-mail address field.

Block 352 represents E-Mail Management System 140 reading the network user's workstation specifications, e.g., the subject, time and date fields of 25 the e-mail.

Block 353 represents E-Mail Management System 140 reading the copy fields of the e-mail header.

Block 354 represents E-Mail Management System 140 reading the e-mail log file.

Next, E-Mail Management System 140 may read the e-mail server log file. E-Mail Management System 140 may use a sorting algorithm as is known in the art to search for the e-mail header fields in the log file to match the sender's e-mail address field, recipient's e-mail address field, subject field, time and date field and copy fields of an e-mail's electronic tag. Block 355 represents E-Mail Management System 140 sorting files to match fields of the e-mail headers.

Once the exact e-mail entry is found, E-Mail Management System 140 may purge the e-mail message by deleting the entry from E-Mail Management System 140. Block 356 represents E-Mail Management System 140 matching an e-mail header to fields in the electronic tags. Block 357 represents E-Mail Management System 140 purging e-mail.

Next, E-Mail Management System 140 may read any back up tapes, other storage media or any copies of the e-mail that may have been listed in the copy field of the e-mail or forwarded to other recipients. Block 358 represents E-Mail Management System 140 reading the copy and forward fields of the e-mail header. E-Mail Management System 140 may use a sorting algorithm to search for the e-mail header fields to match the sender's e-mail address field, recipient's e-mail address field, subject field, time and date field, and copy fields of an e-mail's electronic tag. The system may record the purged e-mail by filing the electronic tag in E-Mail Records Database 180. Block 359 represents E-Mail Management System 140 recording the e-mail purge. The purging process is also recorded in E-Mail Records Database 180.

The system may send a final message to the sender and the recipient to indicate the purging process is completed. Block 360 represents E-Mail Management System 140 sending an e-mail purge confirmation notice.

E-Mail Contracts

Electronic communications are influencing contract law. The greatest challenge has been to determine exactly when and if a contract is created. In E-Mail Management System 140, an organization must determine their electronic contract policies and procedures. The e-mail contract policies may determine how electronic contracts are recorded, delivered and accepted.

Figure 7:
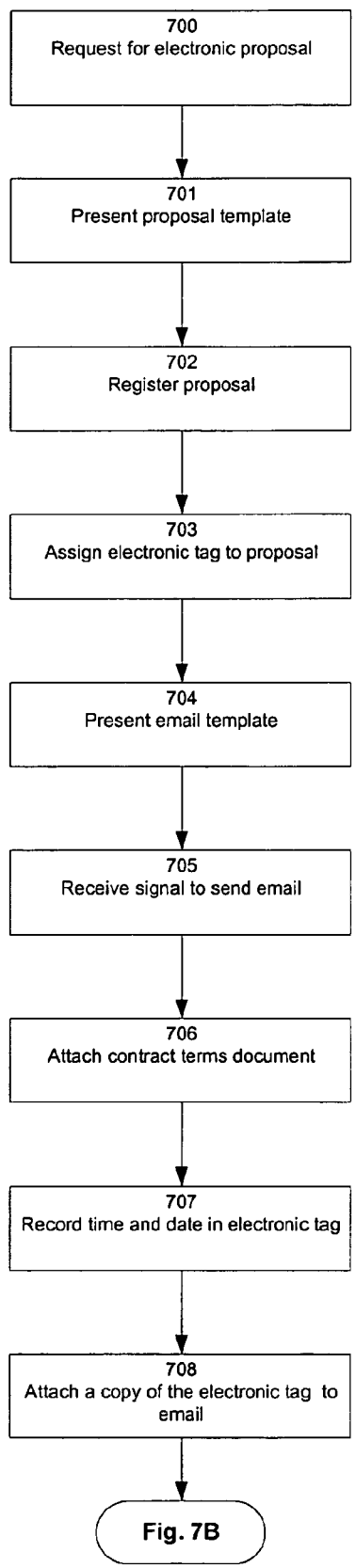
FIGS. 7 and 7B represent flow diagrams illustrating a typical electronic contract process performed by the Electronic Record Management System 135.

FIG. 7 is a flow diagram illustrating a typical electronic contract process performed by E-Mail Management System 140. The network user may indicate that he desires to begin the electronic contract process by choosing an e-mail contract command in E-Mail Management System 140. Block 700 represents E-Mail Management System 140 receiving a request for an electronic: proposal. In response to this request, E-Mail Management System 140 provides the network user with an electronic contract template having an electronic tag. The electronic tag has several fields that the system automatically fills in. The automatic information may be obtained from the network user's user profile and network user's workstation. The network user has the option of filling in several fields to help him reference and/or identify the e-mail message. The optional fields may include client name, client number, project name, project number, the purpose of document and a field for notes (text).

Block 701 represents E-Mail Management System 140 presenting a proposal template to the network user. The electronic tag may record and track all activity related to the electronic proposal and contract process. The network user may complete the electronic contract tag to register the name of the individual or organization that will receive a proposal. Next, the network user may be provided with a form of the organization's proposal. The network user may complete the proposal template. Upon completing the template, the network user may be prompted to save the proposal. A copy of the proposal may be saved and registered in Electronic Contracts Database 190.

Block 702 represents E-Mail Management System 140 registering the proposal. Electronic Contracts Database 190 maintains a record of the organization's electronic proposal and contract documents and their corresponding electronic tags.

Block 703 represents E-Mail Management System 140 assigning an electronic tag to a proposal.

Next, the network user may e-mail the proposal to the prospect. Block 704 represents E-Mail Management System 140 presenting the e-mail template to the network user.

Block 705 represents E-Mail Management System 140 receiving a signal from the network user to send an e-mail.

E-Mail Management System 140 may automatically attach a cover document to the proposal to inform the prospect of the e-mail proposal and the terms of electronic contracting with the offering organization. FIG. 15 is a screen display illustrating an e-mail proposal screen. Block 706 represents E-Mail Management System 140 attaching a contract terms document to the e-mail message. A copy of the electronic tag is sent with the electronic proposal. Block 707 represents E-Mail Management System 140 recording the time and date the proposal e-mail was sent to the prospect in the proposal's electronic tag. Block 708 represents E-Mail Management System 140 attaching a copy of an electronic tag to the e-mail.

Figure 7B:
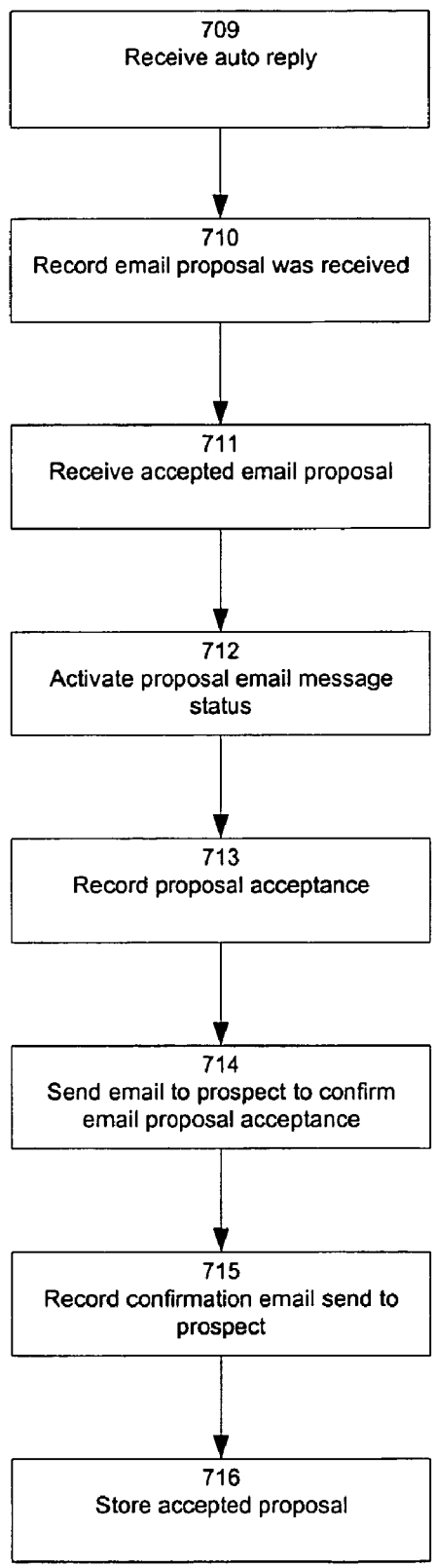
Figure 16:
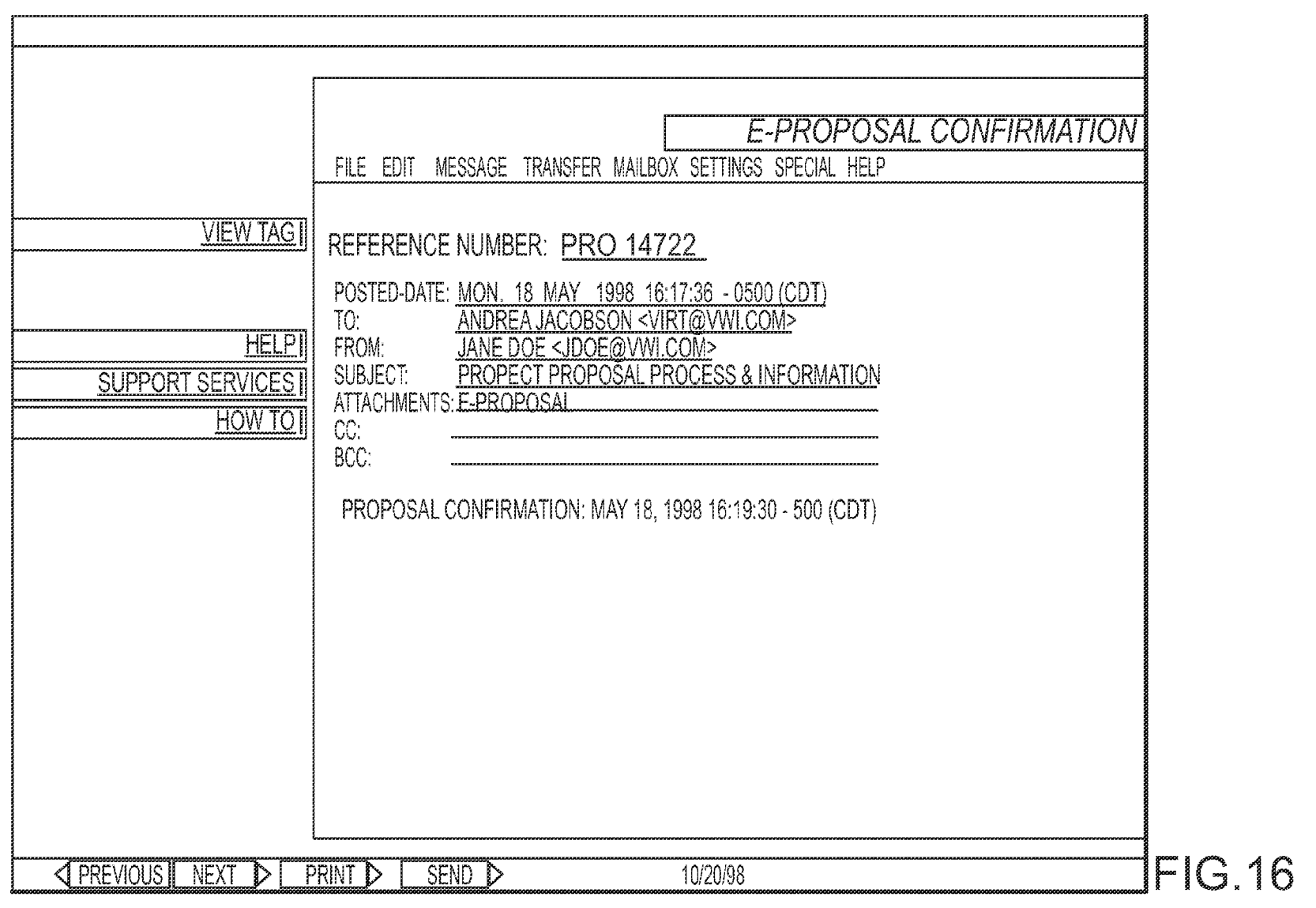

E-Mail Management System 140 may be configured so that, when the prospect opens the e-mail proposal, an e-mail reply with a copy of the electronic tag is sent to the offeror to confirm that the proposal was received and opened by the recipient. FIG. 16 is a screen display illustrating an e-mail proposal confirmation screen. In FIG. 7B, Block 709 represents E-Mail Management System 140 receiving the e-mail auto reply. E-Mail Management System 140 records this activity in the electronic tag for thee proposal stored in Electronic Contracts Database 190. Block 710 represents E-Mail Management System 140 recording that the e-mail proposal was received. The auto reply may be noted in the first line of the e-mail message attached to the master electronic e-mail proposal.

Figure 21:
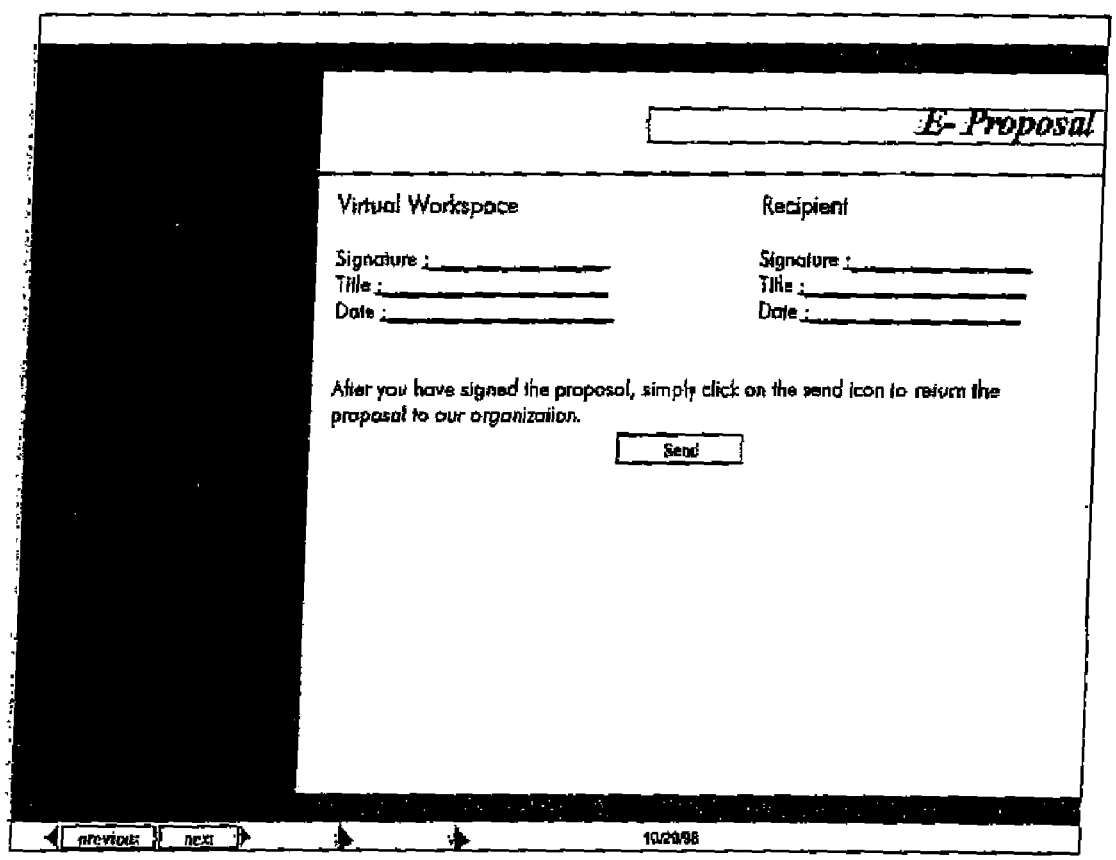
FIG. 21 represents an exemplary screen display illustrating an e-mail proposal signature screen.
Figure 22:
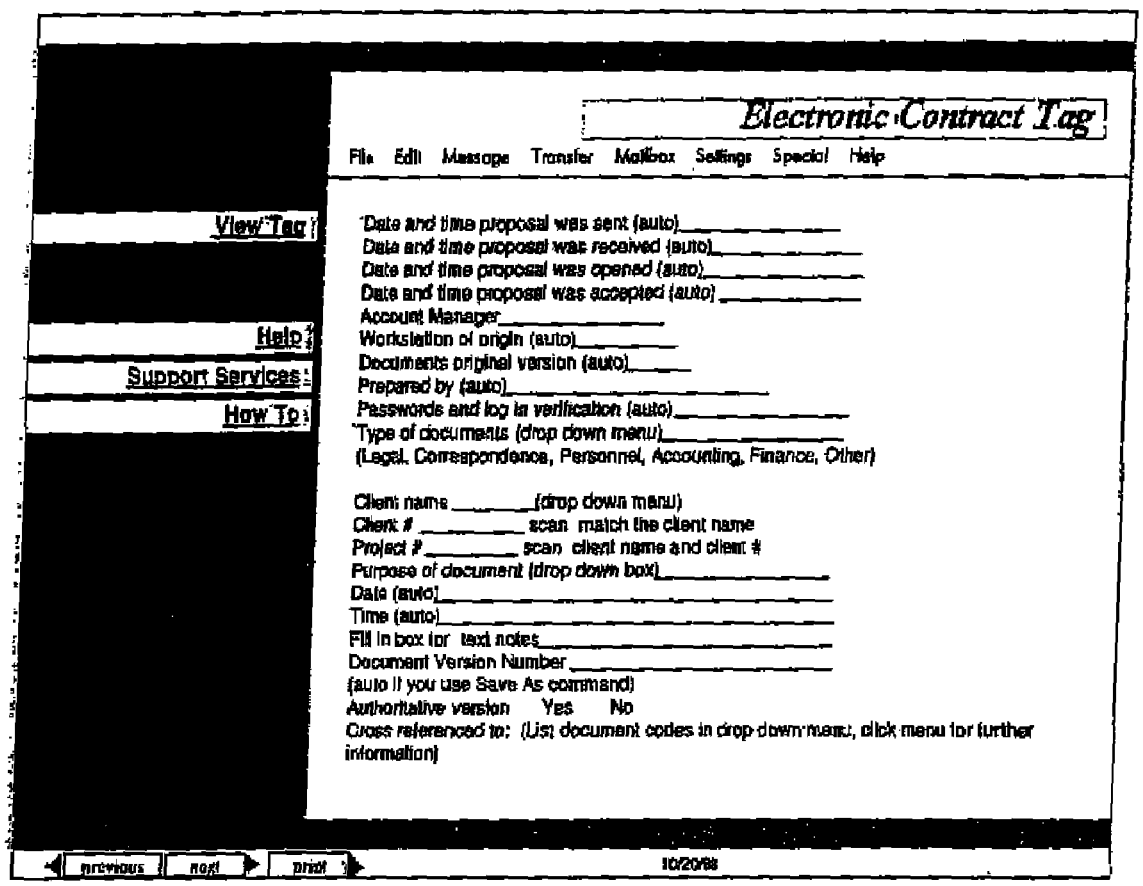
FIG. 22 represents an exemplary screen display illustrating an e-mail contract electronic tag screen.

If the prospect desires to accept the proposal, the prospect may be instructed to complete the attached proposal acceptance form. The proposal acceptance form has an attached electronic tag which records proposal information. FIGS. 17-20 are screen displays illustrating an e-mail proposal screen. The proposal acceptance form may be e-mailed back to the offerer. FIG. 21 is a screen display illustrating an e-mail proposal signature screen. Block 711 represents E-Mail Management System 140 receiving an accepted e-mail proposal. E-Mail Management System 140 may require that the proposal may only be returned to the offerer and the e-mail address field may not be altered. Block 712 represents E-Mail Management System 140 activating the proposal e-mail message status. The proposal message status informs the offeror that an e-mail proposal has been received. The network user typically may define how, he wants to be notified by setting choosing from several message notification options from the message notify menu. For example, the network user may choose notification options that include notifying the offeror via an icon flashing on the screen, an icon flashing with a sound or via an automated e-mail message, or a pager number may be dialed by the system and an e-mail contract waiting message tone or text message may appear on the offeror's pager. The electronic tag records the time and date the proposal entered the e-mail system. FIG. 22 is a screen display illustrating the e-mail contract electronic tag screen. When the offeror opens the accepted proposal, the system typically automatically sends an e-mail message to the prospect (i.e., client) to confirm that the proposal acceptance e-mail message was received. Block 713 represents E-Mail Management System 140 recording the proposal acceptance. Block 714 represents E-Mail Management System 140 sending an e-mail to prospect to confirm e-mail proposal acceptance. Block 715 represents the system recording that the confirmation e-mail was sent to the prospect. The proposal acceptance information may be recorded by the electronic tag. As soon as the electronic proposal is received by the offerer's e-mail system, E-Mail Management System 140 typically alerts the offerer and sends an e-mail reply to the prospect to confirm that the proposal was received. The electronic proposal e-mail may be implemented to alert the network user that a proposal has been received such as, for example, by flashing a proposal icon on the network user's workstation. Block 716 represents E-Mail Management System 140 storing the accepted proposal. E-Mail Management System 140 may store the accepted proposal in Electronic Contracts Database 190.

In addition to the proposal tracking process, all contract and client-related correspondence may be tracked via e-mail and/or documents stored in the central repository database 150.

Watermark

E-Mail Management System 140 may be configured so that a watermark is used to authenticate an e-mail message. In one embodiment of E-Mail Management System 140, a watermark may be a user definable print feature which may be comprised of an image which is unique to an organization, business unit, department, branch or other segment of an organization's business. The watermark may also contain information that links the e-mail to information contained in its electronic tag, which may include its reference code, the date the document was printed, the workstation the e-mail form was sent from, who sent the e-mail, and other user-definable fields to record system or user information.

FIG. 4 is a flow diagram illustrating the process used by the system to print a document containing a watermark. The network user may choose to print a document containing a watermark. After E-Mail Management System 140 receives the print request, E-Mail Management System 140 may retrieve the e-mail from Electronic Contracts Database 190. Block 401 represents E-Mail Management System 140 receiving the print request. Block 402 represents the system retrieving the e-mail from Electronic Contracts Database 190. E-Mail Management System 140 may retrieve the watermark image from a watermark database 200. Block 403 represents E-Mail Management System 140 retrieving a watermark image.

Next, E-Mail Management System 140 may begin assembling a watermark. The system may read several fields from the e-mail's electronic tag. Block 404 represents E-Mail Management System 140 reading fields from the electronic tag. The minimal fields read may include its reference code, the date the document was printed, the workstation the e-mail form was sent from, and who sent the e-mail form. Additional user-definable fields may be read by E-Mail Management System 140. E-Mail Management System 140 may insert the reference code from the reference code field of the electronic tag into the image. Block 405 represents E-Mail Management System 140 inserting the reference code into the image. Next, the image may be placed in the e-mail document. Block 406 represents E-Mail Management System 140 placing the image in the e-mail document. Next, the e-mail file with the watermark is sent to the printer to be printed. Block 407 represents E-Mail Management System 140 sending the e-mail to printer. The information embedded in the watermark allows an end user the opportunity to track the printed document to the e-mail's electronic tag stored in the central repository database 150.

E-Mail File Attachments

The system may be configured so that files attached to e-mail messages are also retained in E-Mail Records Database 180. It typically is important to store the file attachment with the e-mail message in order to ensure proper record management. Each file attachment may be converted to an HTTP format. This will allow E-Mail Management System 140 to maintain a picture of the file. The system may also utilize file compression software, e.g., PKUNZIP, to compress the files to increase file storage space.

E-Mail Records Management Database

E-Mail Records Database 180 provides a method to index, record and store business e-mail messages sent from an organization and may act as method to authenticate e-mail messages. As a policy all business e-mail messages sent outside of an organization may be required to have a method to retain a copy of each message and a way to prove the message's authenticity.

After an e-mail message has been assigned a reference code and is sent, E-Mail Management System 140 typically begins the process of recording the message in E-Mail Records Database 180. The business e-mail's reference code, e.g., BEM, instructs E-Mail Management System 140 to automatically convert the text: file format of the e-mail message into a read-only format for storage in the central repository database 150. Next, E-Mail Management System 140 records a copy of the e-mail message into E-Mail Records Database 180 and copies the e-mail message into the central repository database 150. This process allows an organization to retain a copy of all business e-mail messages for their records. E-mail authentication is insured since the business e-mail message was copied immediately after the network user stored or sent the e-mail message.

E-Mail Records Database 180 utilizes the reference code from the e-mail's electronic tag to index, store and record the e-mail message in E-Mail Records Database 180. The reference code assists the system in indexing the e-mail into the correct master file. For example, the master file number may be 9082. The business e-mail reference code may be BEM9082. The reference number tells the system to file the business e-mail in the file with the master number 9082.

E-Mail Management System 140 is typically configured so that most network users may not have access to E-Mail Records Database 180 due to the fact that the purpose of E-Mail Records Database 180 is to provide authentic records of the business e-mail messages sent and received by the organization. A high level official within the organization may use an encryption key to access the e-mail records within E-Mail Management System 140.

E-Mail Record Retrieval

Figure 23:
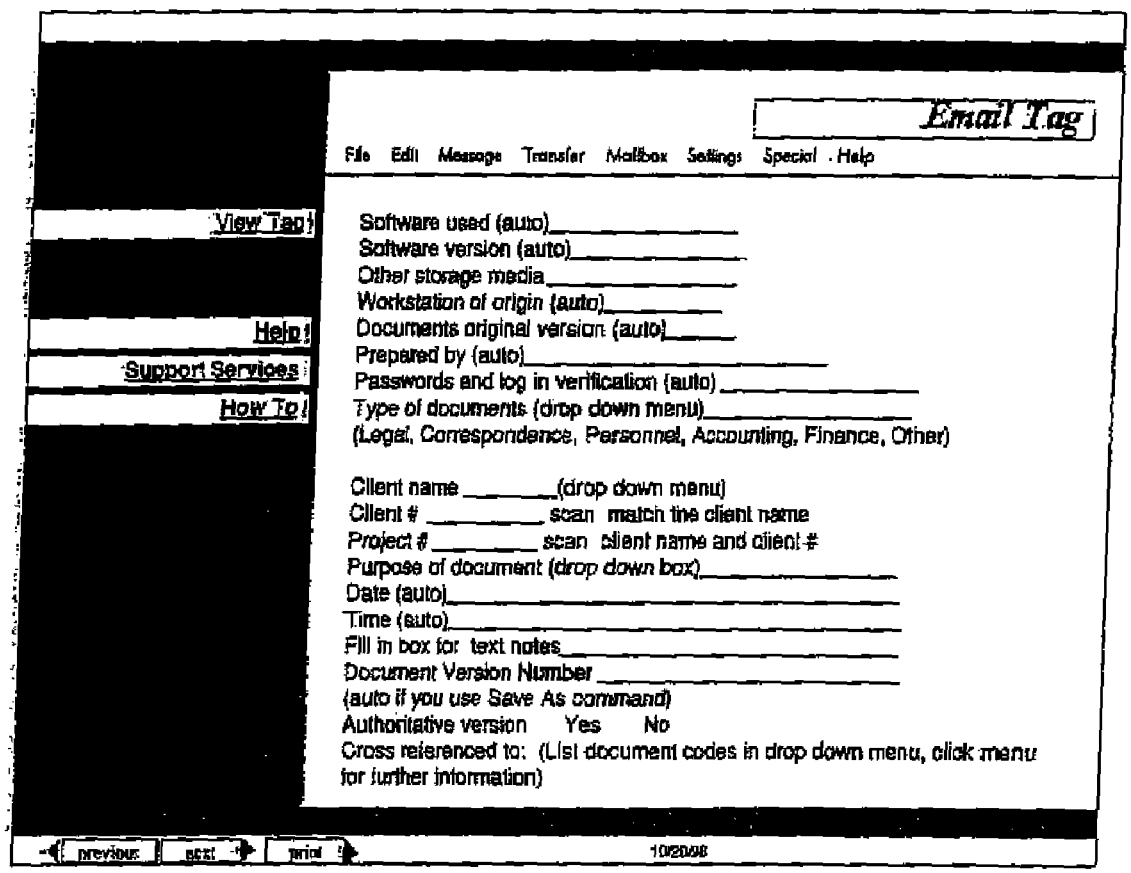
FIG. 23 represents an exemplary screen display illustrating an electronic tag screen.

All business e-mail may be indexed, stored and retrieved by its electronic tags and stored in E-Mail Records Database 180. The electronic tag, with its information fields, allows search engines to quickly retrieve messages from the central repository database 150. FIG. 23 is a screen display illustrating an electronic tag screen. The network user searches the central repository database 150, such as with a web browser or other search tool. Electronic tags allow E-Mail Management System 140 to maintain a historical record of an e-mail message. An e-mail's historical record begins when the e-mail is first assigned an electronic tag and is registered in the document management system 135. An e-mail's historical record is collected by the information recorded in an e-mail's electronic tag. The electronic tag information is stored in the central repository. An e-mail's electronic tag is typically not deleted from E-Mail Management System 140 until the e-mail is formally disposed of according to an organization's records management policy.

Figure 24:
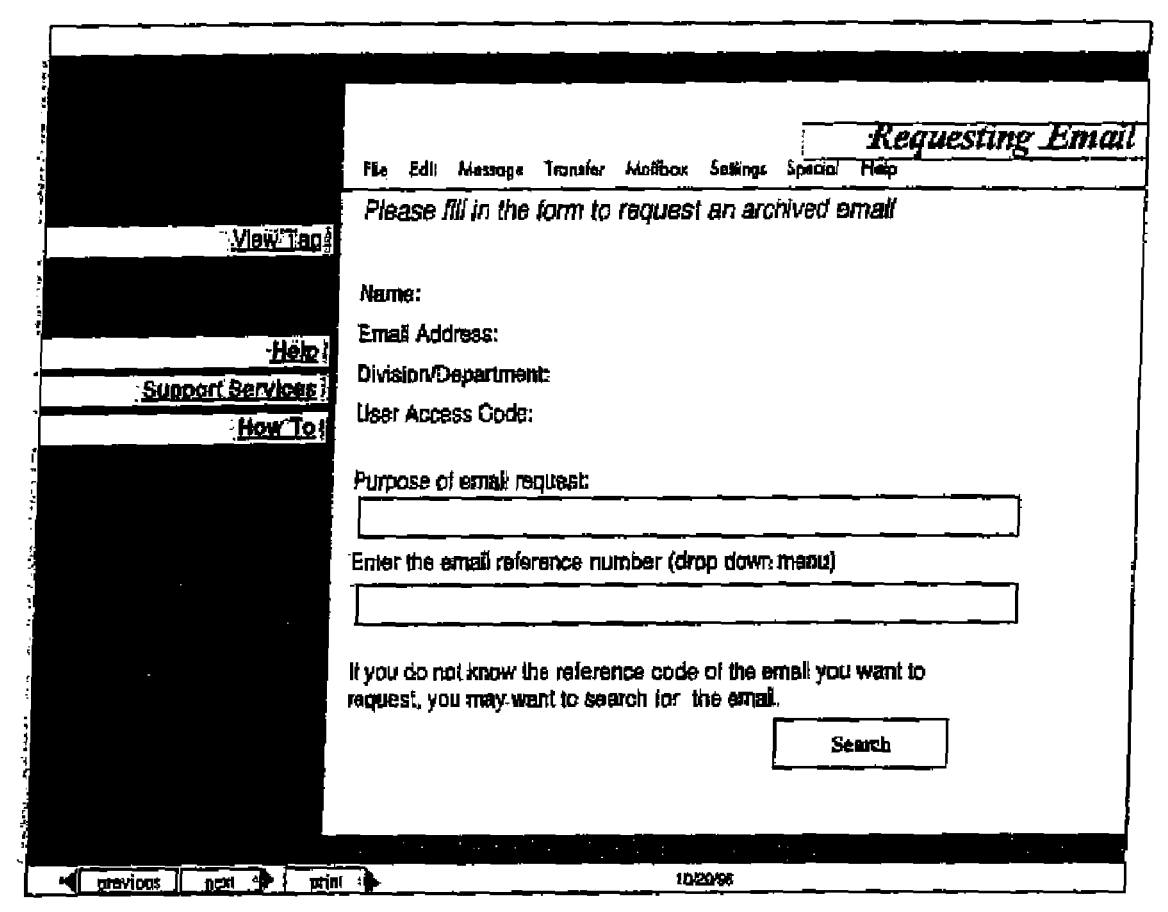

E-Mail Management System 140 may be configured so that a document management Intranet web site may be used to access a related document's electronic tag information and document history. The network user typically has the option of filling in several fields to request information about a particular document. The screen user interface may be similar to a World Wide Web search engine interface. FIG. 24 is a screen display illustrating a screen to request an e-mail record. The user may have the option of completing as many or as few fields as he or she desires. An example of an existing search engine is Lycos on the World Wide Web.

Figure 25:
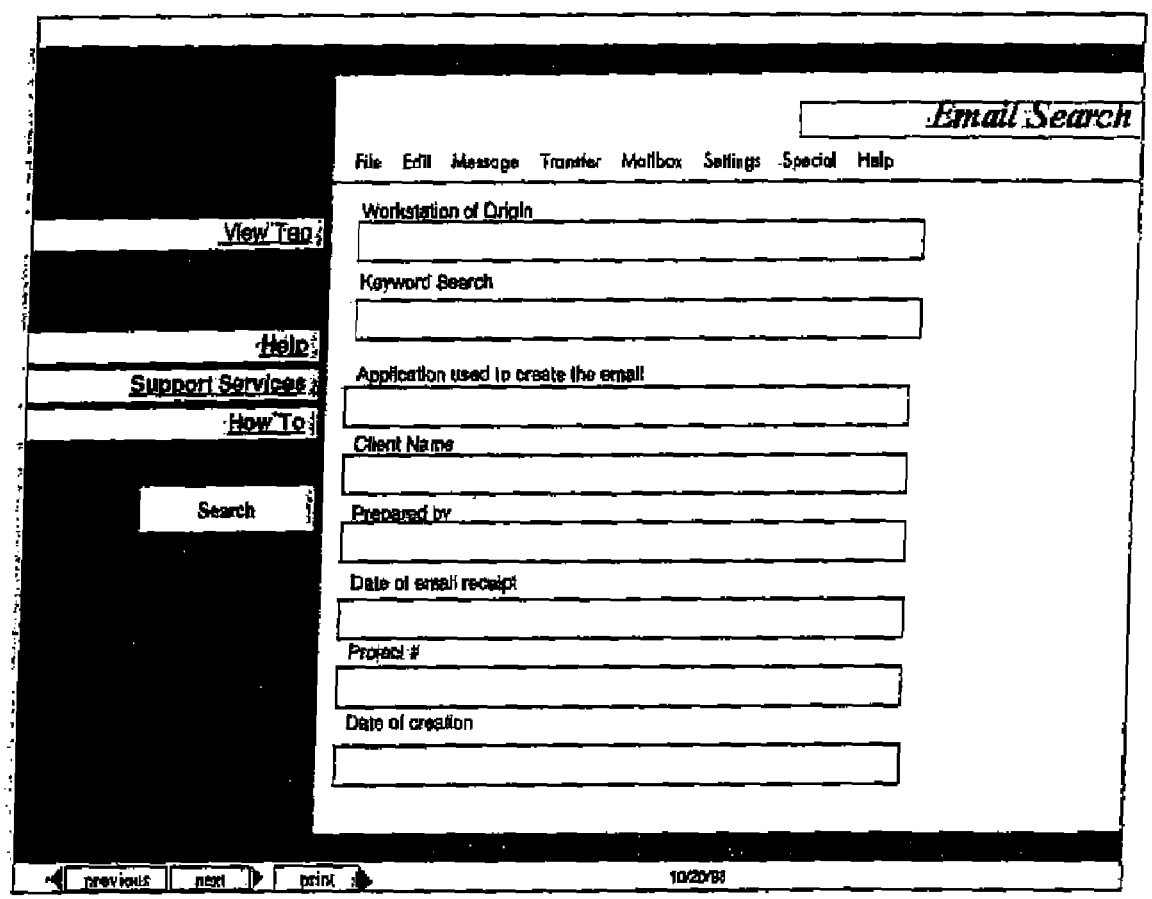
FIG. 25 represents an exemplary screen display illustrating a search engine interface.
Figure 26:
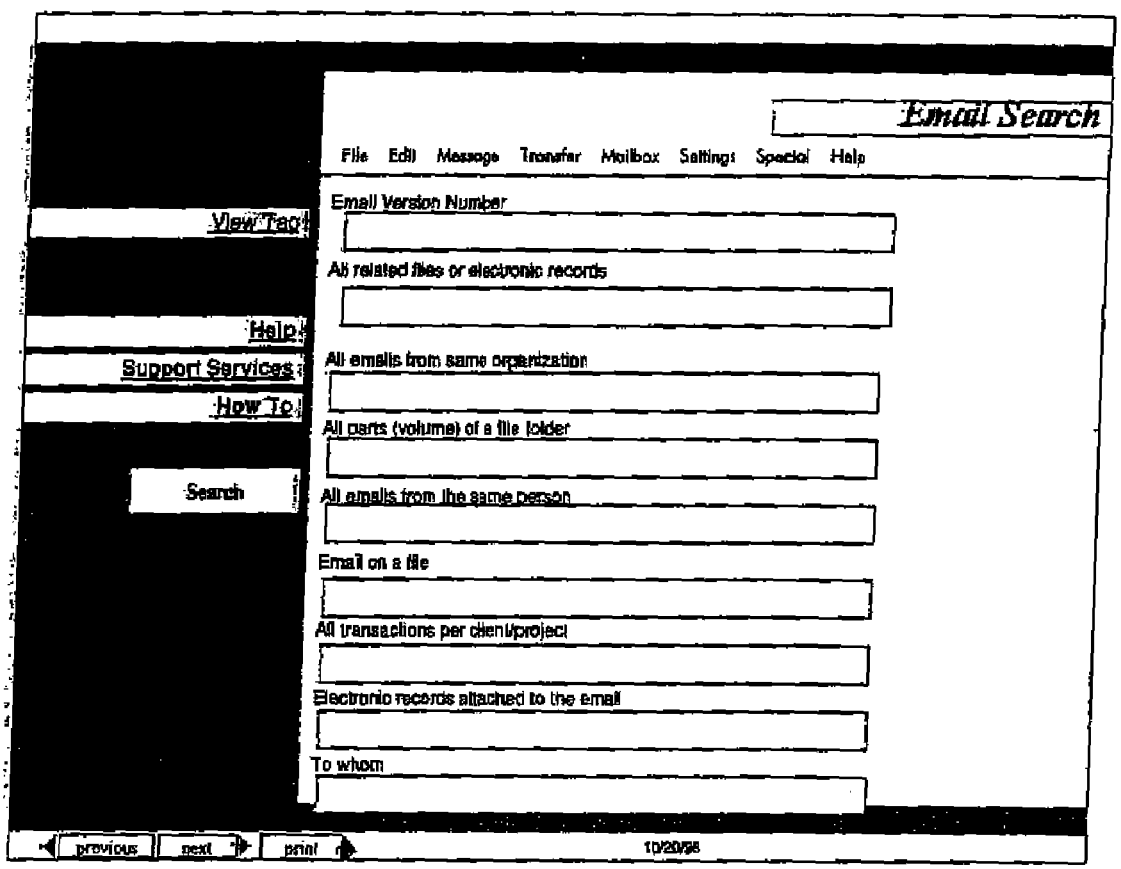
FIG. 26 represents an exemplary screen display illustrating another search engine interface.
Figure 27:
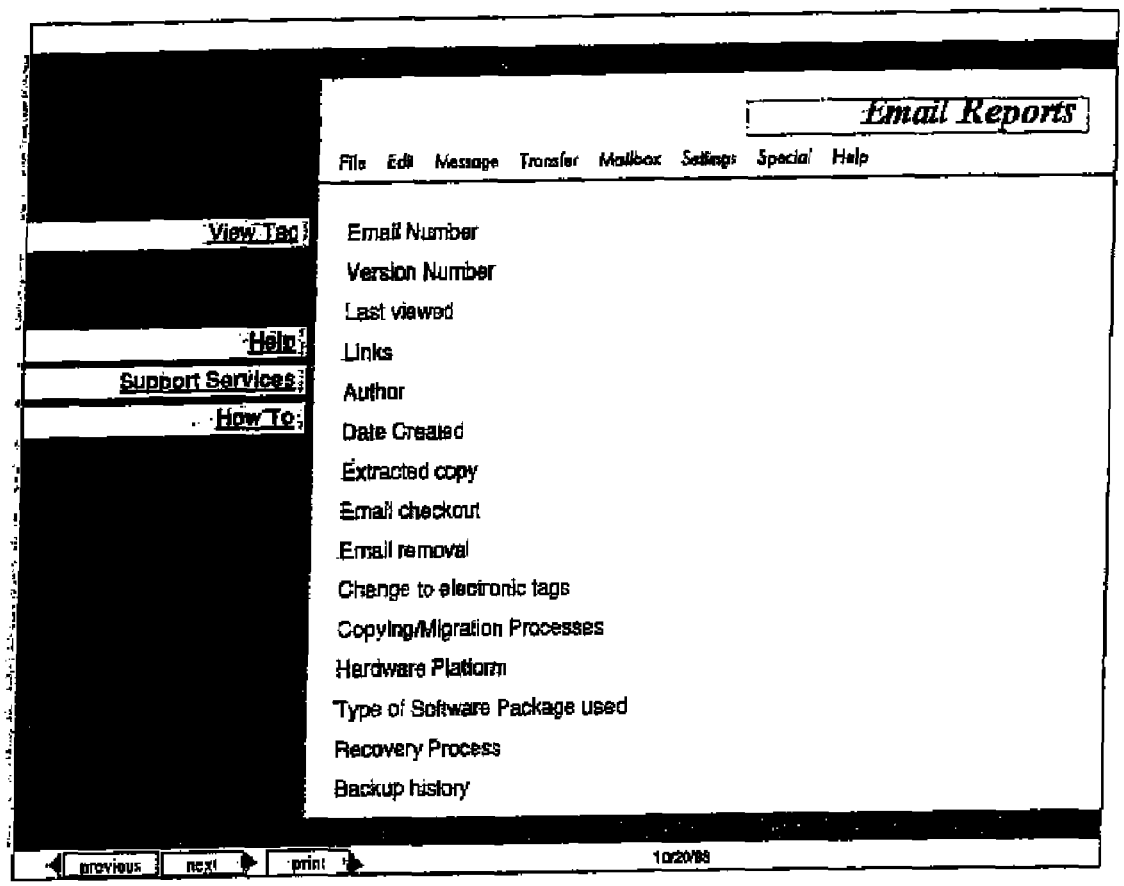
FIG. 27 represents an exemplary screen display illustrating an e-mail report.

During a typical search, E-Mail Management System 140 searches the electronic tags in the central repository to obtain document information and returns the results to the network user. FIG. 25 is a screen display illustrating a search engine interface. FIG. 26 is a screen display illustrating a search engine interface. Once the e-mail is retrieved, an e-mail's electronic tag may appear on the screen. FIG. 27 is a screen display illustrating an e-mail report. A search for an electronic tag may produce several records including the document's access history including records of who last viewed the document and for how long, who extracted a copy of the document, who checked out the document, who returned the document, who removed the document, and any changes in electronic tags, information on all versions of a particular document, and any copying or migration processes leading to the current version, including the software used during the copying and migration process, the type of platform(s) and/or software used to reformat or convert the document as part of that migration, and the type of software package(s) used to alter or copy the document's content and machine generated evidence, indicating any changes which were made to the document's content, the recovery process, including the date and time a backup copy was made, and the date and time of the recovery. This permits identification of any "window" in which an updated version of the document, now lost, could have been used. All documents with electronic tags may be stored on optical media, in a stand-alone system or a network environment, and can be dynamically accessed by the document title, information fields in the document's electronic tag or the electronic reference number through search engines. An example of an existing search engine is the Yahoo® system available on the World Wide Web. Such search engines may be used to review all of the information in the central repository to match a document query. For example, a search can be made across multiple document types (series), limited to a particular document type or a group of document types and can use several search methods to focus on a particular value, field, date, text string or range of values, can combine several search methods, such as Boolean logic. Search strategies can be saved for future reference.

Policy makers, legal counsel and high level management of an organization typically are the only individuals who may have access to E-Mail Records Database 180. Pretty Good Privacy is an encryption key that is currently on the market and that is designed to insure the integrity and authenticity of the business e-mail messages stored in E-Mail Records Database 180.

Automated E-Mail Record Storage, Disposal and Purging

E-Mail Records Database 180 typically calculates the life cycle stage of all records, including e-mail, and prints a record of all semi-active and final stage records so that they may be removed from active storage and placed on appropriate storage media such as secondary optional media or in a box for transfer off-site. Known products that manage records include Records Management Software available from QRMS. The process may be recorded in the policy effectiveness module 120 and stored in E-Mail Records Database 180. E-Mail Management System 140 may prompt the system administrator via e-mail and may identify the documents that are to be eliminated, purged and/or are no longer needed for any legal, operational or other purpose.

Print, Access and Viewing Options

E-Mail Management System 140 may be configured to provide for various e-mail print options including Electronic Tag Only, E-mail Only, and E-mail with Tag, No Print, No Access, Limited Access, No Viewing, E-mail with file attachment and typically are detailed in the print option section of the document management system 135. This process is similar to printing documents in a word processing system such as the Microsoft Word word processing system available from Microsoft Corporation.

When printing from E-Mail Records Database 180, network users may be required to have an encryption key, such as the Pretty Good Privacy system mentioned earlier.

E-Mail Records Retention

Figure 28:
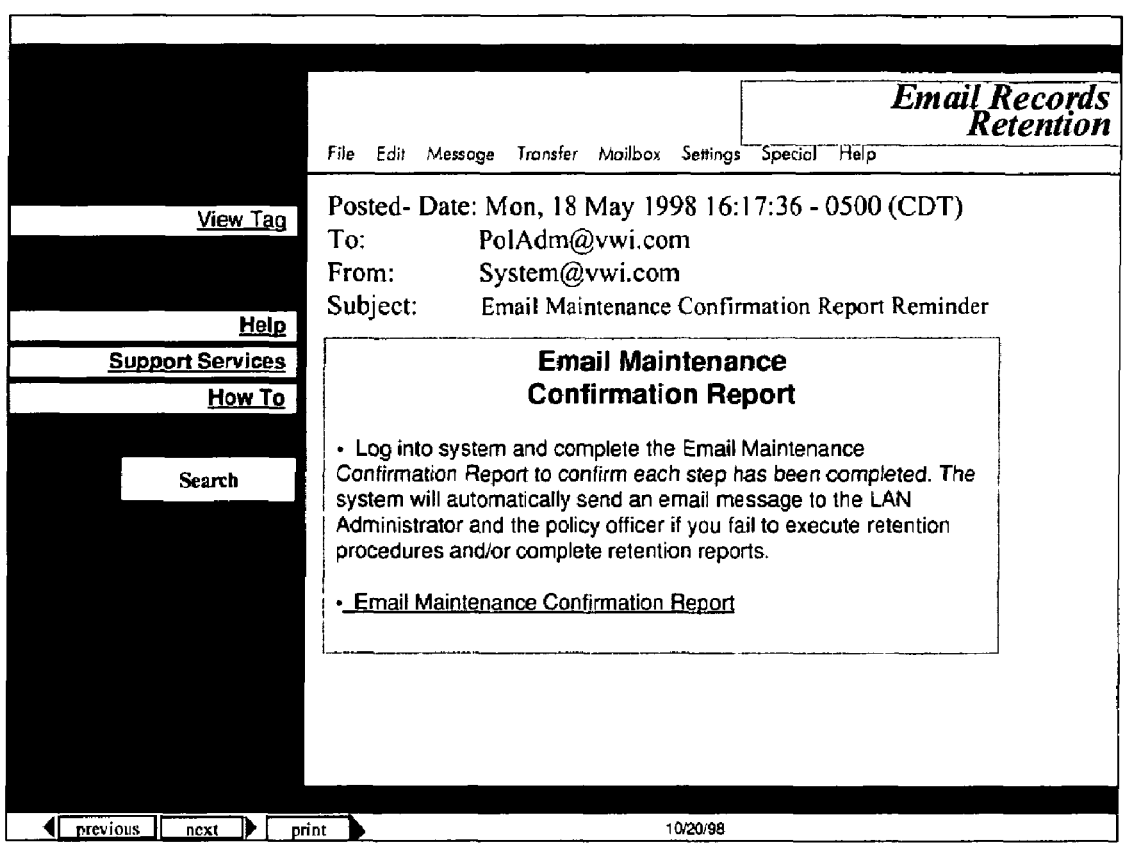
FIG. 28 represents an exemplary screen display illustrating an e-mail records retention notice.

Typical e-mail systems enable users to delete messages from the "in-box," but the e-mail messages are likely stored on one or more file servers and backup tapes. Records retention software such as RetentionManager available from Skupsky provides for the tracking and automating records retention by the system administrator. E-Mail Management System 140 may be configured to automatically reminds the system administrator to execute records retention procedures in the e-mail records retention module. The e-mail records retention module typically provides system administrators with a checklist of procedures to execute as part of managing E-Mail Management System 140. FIG. 28 is a screen display illustrating an e-mail records retention notice. The system administrator usually may not bypass the tasks within E-Mail Management System 140 such as purge the messaging system, properly dispose of internal messaging records and media, backup/archive (time field can be chosen) e-mail server messages to tape/media, label and date e-mail tape/media, register new e-mail tape/media in the system's tape archive database, indicate the storage and location of newly archives e-mail tape/media, and the proper dispose procedures of archived e-mail tape/media. If the system administrator continues to ignore reminders related to such tasks, E-Mail Management System 140 preferably requires the system administrator to execute the tasks in order to proceed with the use of the system.

Figure 29:
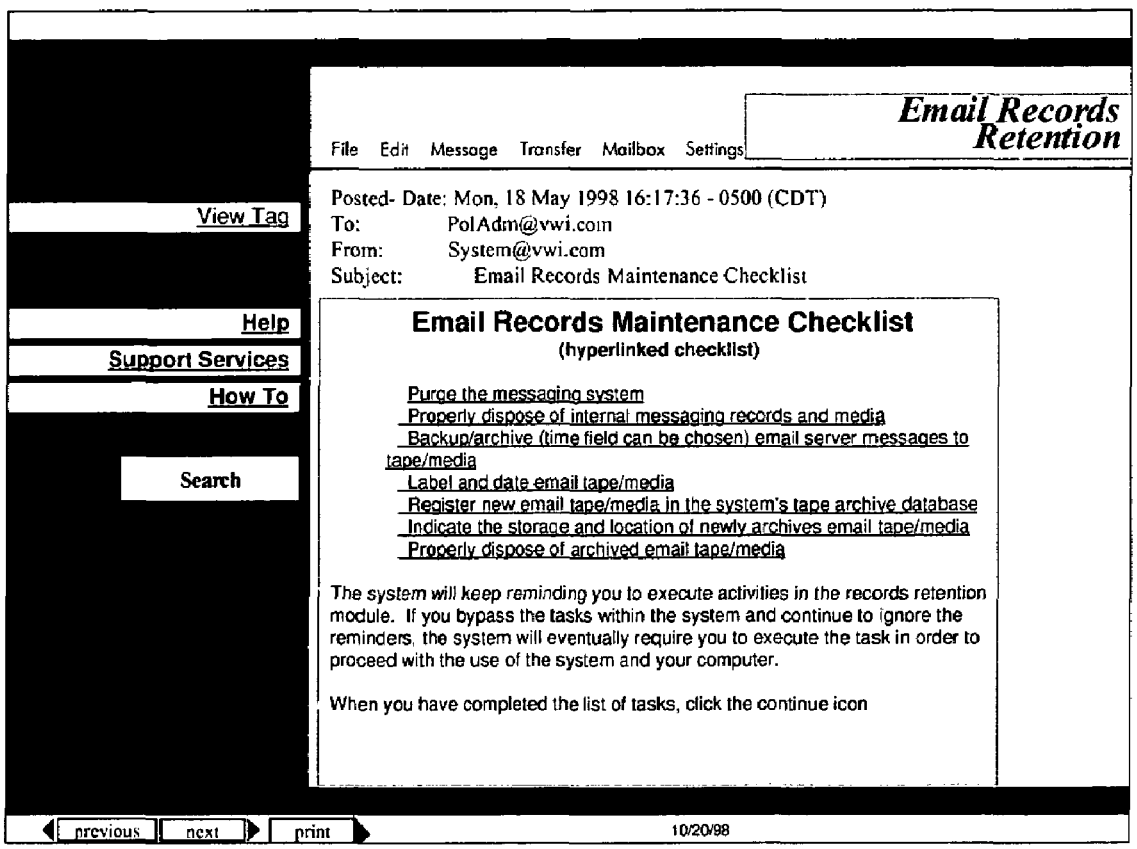
FIG. 29 represents an exemplary screen display illustrating a records retention confirmation notice.

After the system administrator has followed the instructions, the system administrator is prompted to log into E-Mail Management System 140 and complete the record retention report form to confirm each step has been completed. FIG. 29 is a screen display illustrating a records retention confirmation report. E-Mail Management System 140 may send e-mail messages to the LAN Administrator and a policy officer if the system administrator fails to execute retention procedures and/or complete retention reports. E-Mail Management System 140 has several technical support options to access in-house tech support via telephony, e-mail message, fax, or telephone.

The foregoing description of the embodiments of the present system have been presented for the purposes of illustration and description. It is not intended to be exhaustive or to limit the invention to any particular form disclosed. Many modifications and variations are possible. It is intended that the scope of the invention be limited only by the following claims.

What is claimed is:

1. In a distributed computing environment, a method for managing an electronic record for compliance with network security policies of an organization, the method comprising:
    creating an electronic tag that uniquely identifies the electronic record, the electronic tag being associated with a deletion prevention time period for compliance with the network security policies;
    storing the electronic tag in a central repository;
    sending the electronic record to a recipient computer;
    initiating execution of scripting code associated with the electronic tag to prevent the electronic record from being deleted before expiration of the deletion prevention time period associated with the electronic tag;
    evaluating the electronic tag to determine if the electronic record is to be deleted based on expiration of the deletion prevention time period;
    causing searching of the recipient computer for the electronic record; and
    causing deletion of the electronic record from the recipient computer.

2. The method of claim 1, further comprising selectively deleting the electronic tag.

3. The method of claim 1, further comprising storing the electronic record.

4. The method of claim 1, wherein the distributed computing environment comprises a computer having a registry and a user profile, and wherein creating the electronic tag comprises generating a reference code and creating the electronic tag at least in part as a function of at least one of the registry, the user profile, and the reference code.

5. The method of claim 4, wherein generating the reference code comprises reading the electronic record.

6. The method of claim 4, wherein the reference code comprises a classification code and an index code.

7. The method of claim 6, wherein the classification code is selected from a group comprising business email, personal email, intramail, bulletin board, minutemail, and purgemail.

8. The method of claim 6, wherein the index code identifies the contents of an electronic record and the recipient of the electronic record.

9. The method of claim 1, wherein creating the electronic tag comprises:
    reading a stored electronic tag; and
    generating an electronic tag in response to accessing an electronic record.

10. The method of claim 1, wherein the electronic record comprises an email message.

11. The method of claim 1, wherein sending the electronic record comprises:
    reading the electronic tag; and
    generating a new electronic tag at least in part as a function of the read electronic tag, a computer registry, a user profile, and a reference code.

12. In a distributed computing environment, an apparatus for managing an electronic record for compliance with network security policies, the apparatus comprising:
    a computer system comprising at least one processor and at least one memory, the computer system being configured to
        create an electronic tag that uniquely identifies the electronic record, the electronic tag being associated with a deletion prevention time period for compliance with the network security policies;
        store the electronic tag in a central repository storing a plurality of electronic tags each associated with one of a plurality of electronic records;
        send the electronic record to a recipient computer; and
        evaluate the plurality of electronic tags stored in the central repository to identify an electronic tag for which the deletion prevention time period has elapsed;
        cause searching of the recipient computer for an electronic record associated with the identified electronic tag; and
        cause deletion of the electronic record associated with the identified electronic tag from the recipient computer.

13. The apparatus of claim 12, wherein the computer system is further adapted and arranged for purging the electronic record by deleting the electronic record associated with the identified electronic tag and selectively deleting the identified electronic tag.

14. The apparatus of claim 12, wherein the distributing computing environment comprises a computer having a registry and a user profile, wherein the computer system is configured and arranged to: generate a reference code, wherein the electronic tag is generated at least in part as a function of at least one of the registry, the user profile, and the reference code.

15. In a distributed computing environment, an article of manufacture for managing an electronic record for compliance with network security policies, the article of manufacture comprising a computer-readable storage medium having a computer program embodied therein that causes the distributed computing environment to:
    create an electronic tag that identifies the electronic record, the electronic tag being associated with a deletion prevention time period for compliance with the network security policies;
    send the electronic record to a recipient computer;
    evaluate the electronic tag to determine if the electronic record is to be deleted based on expiration of the deletion prevention time period;

cause searching of the recipient computer for the electronic record; and causing deletion of the electronic record from the recipient computer.

16. The article of claim 15, wherein the computer program further causes the distributed computing environment to purge the electronic record by deleting the electronic record and selectively deleting the electronic tag.

17. The article of claim 15, wherein the computer program further causes the distributed computing environment to store the electronic record.

18. The article of claim 15, wherein the distributed computing environment comprises a computer having a registry and a user profile, wherein the computer program further causes the distributed computing environment to generate a reference code, wherein the electronic tag is generated at least in part as a function of at least one of the registry, the user profile, and the reference code.

19. The article of claim 15, wherein the computer program further causes the distributed computing environment to:

read stored electronic tags; and generate a further electronic tag in response to accessing an electronic record.

20. In a distributed computing environment, a method for managing an electronic record for compliance with network security policies of an organization, the method comprising:

creating an electronic tag that uniquely identifies the electronic record, the electronic tag being associated with a deletion prevention time period for compliance with the network security policies;

storing the electronic tag in a central repository storing a plurality of electronic tags each associated with one of a plurality of electronic records;

sending the electronic record to a recipient computer;

evaluating the plurality of electronic tags stored in the central repository to identify one or more electronic records to be deleted based on expiration of the deletion prevention time period;

evaluating a user profile of a user associated with the one or more electronic records identified for deletion to determine a deletion privilege of the user; and according to the deletion privilege perform at least one of
deleting the electronic record identified for deletion and the electronic tag associated therewith stored in the central repository; and deleting the electronic record identified for deletion without deleting the electronic tag associated therewith stored in the central repository.

21. A computing device operably coupled to a network comprising:

means for creating an electronic tag that uniquely identifies the electronic record, the electronic tag being associated with a deletion prevention time period for compliance with the network security policies;

means for storing the electronic tag in a central repository storing a plurality of electronic tags each associated with an electronic record;

means for sending the electronic record to a recipient computer means for evaluating the plurality of electronic tags stored in the central repository to identify one or more electronic records to be deleted based on expiration of the deletion prevention time period;

means for causing searching of the recipient computer for the electronic records to be deleted; and means for causing deletion of the electronic records to be deleted from the recipient computer.

* * * * *